US009665589B1

(12) United States Patent
Joyce et al.

(10) Patent No.: US 9,665,589 B1
(45) Date of Patent: May 30, 2017

(54) TECHNIQUES FOR REDUCING RESOURCE PROPERTY FILES

(71) Applicant: EMC IP Holding Company LLC, Hopkinton, MA (US)

(72) Inventors: Scott E. Joyce, Foxboro, MA (US); Donald E. Labaj, Northborough, MA (US); Timothy J. Cox, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 13/799,890

(22) Filed: Mar. 13, 2013

(51) Int. Cl.
*G06F 17/30* (2006.01)
(52) U.S. Cl.
CPC .............................. *G06F 17/3015* (2013.01)
(58) Field of Classification Search
CPC ......... G06F 17/30067; G06F 17/30595; G06F 17/30961
USPC ........................................ 707/963, 715, 716
See application file for complete search history.

(56) References Cited

U.S. PATENT DOCUMENTS

| 7,571,426 | B2 * | 8/2009 | Carroll, Jr. ................ 717/109 |
| 2003/0051005 | A1 * | 3/2003 | Burch et al. ................ 709/219 |
| 2010/0095276 | A1 * | 4/2010 | Ottavi et al. ................ 717/125 |
| 2011/0093510 | A1 * | 4/2011 | Beck et al. .................. 707/803 |
| 2012/0314851 | A1 * | 12/2012 | Kusakabe ........... H04N 1/00204 379/100.06 |

OTHER PUBLICATIONS

Anirudh Takkallapally, et al., U.S. Appl. No. 12/570,716, filed Sep. 30, 2009, Managing User Interface Characteristics in Displaying Data Storage System Information.
Scott E. Joyce, et al., U.S. Appl. No. 13/626,323, filed Sep. 25, 2012, Centralized Support for Application User Interface Elements.

* cited by examiner

*Primary Examiner* — Rehana Perveen
*Assistant Examiner* — Loc Tran
(74) *Attorney, Agent, or Firm* — Muirhead and Saturnelli, LLC

(57) ABSTRACT

Described are techniques for generating a combined property file. A plurality of individual property files may be provided which specify a plurality of property values for properties of user interface elements for an application. The plurality of property values may include a first value for a first property of a user interface element for the application. A combination property file generator may be executed to perform first processing that includes combining at least a first portion of the plurality of individual property files into the combined property file.

19 Claims, 16 Drawing Sheets

TECHNIQUES FOR REDUCING RESOURCE PROPERTY FILES

BACKGROUND

Technical Field

This application generally relates to user interfaces and more particularly to controlling characteristics of user interface elements of a user interface.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with an application for management of data storage systems, or more generally any application, a user interface may be displayed. Existing applications providing a user interface may control various aspects of user interface (UI) elements, such as visual aspects of buttons, displayed text, and the like, by setting properties of the user interface elements within the application code.

SUMMARY OF THE INVENTION

In accordance with one aspect of the invention is a method of generating a combined property file comprising: providing a plurality of individual property files, the plurality of individual files specifying a plurality of property values for properties of user interface elements for an application, said plurality of property values including a first value for a first property of a user interface element for the application; and executing a combination property file generator to perform first processing, said first processing including: combining at least a first portion of said plurality of individual property files into the combined property file. The combined property file may have a first file format. The combined property file may include property values for properties of user interface elements specified in each individual property file in the first portion and may include metadata for each individual property file in said first portion. The metadata for each individual property file may include a name or identifier for said each individual property file. The first file format may logically locates said each individual property file and metadata for said each individual property file immediately adjacent to one another in the combined property file. The combined property file may include combined property file metadata. The first file format may include a combined metadata portion and a combined property file portion. The combined metadata portion may include the metadata for each of the individual property files in the first portion. The combined property file portion may include property values for properties of user interface elements obtained from each of the individual property files. The combined metadata portion may be logically located in the combined property file prior to said combined property file portion. The combined metadata portion may include an identifier for each of the individual property files in the first portion and an associated offset denoting a starting logical location in the combined property file at which property values for properties of user interface elements obtained from said each individual property file are located. the first file format may be a first of a plurality of combined property file formats and the combined metadata portion may include first information denoting said first combined property file format. The plurality of individual property files may have file names in accordance with a predetermined file naming convention or pattern and the combination property file generator may select the first portion of individual property files from said plurality of individual property files in accordance with combination criteria. The plurality of individual property files may be included in a predetermined look-up chain of individual property files defining an ordering in which said plurality of individual property files are processed to determine a final property value for a property of a user interface element. The method may include invoking a look-up service to determine a first property value for the first property of the user interface element of said application. The look-up service may process one or more files including said combined property file including property values for properties of user interface elements. The look-up service may process content of the combined property file in accordance with a format of said combined property file and in accordance with said ordering of said predetermined look-up chain of individual property files to determine final values for properties included in said combined property file. The one or more files may include a first of said plurality of individual property files not included in the first portion. The look-up service may process the first individual property file and the combined property file including property values obtained from the first portion of individual property files in accordance with said ordering to determine final values for properties included in said combined property file. A first set of property values for properties of user interface elements included in the combined property file and obtained from said first portion of individual property files may be processed in accordance with said ordering thereby in a manner similar to that as if the first set of property values are read in directly from each individual property file in said portion by the look-up service. The combination property file generator may be executed and may perform said first processing in connection with any of: installation of said first application, on demand in response to a request, and as part of building software components of said first application prior to installation. The look-up service may read said combined property file in response to a request for said first property value for said first property of said user interface element of said application. The combined property file may be generated by said combination property file generator responsive to said request. The predetermined look-up chain of individual property files may include one or more individual property files in accordance with a chain of entities distributing said application thereby providing for customization by said entities. The predetermined look-up chain may include one or more individual property files specifying different user interface settings customized in accordance with any of a geographic location, language and dialect of a particular language. The first property may affect any of a visual aspect of said user interface element when displayed, user interaction with said user interface element, a font, text size, a color, a physical dimension, a location or placement of said user interface element in connection with displaying, an ordering of said user interface element relative to one or more other user interface elements, a target location from which a webpage is retrieved responsive to selecting the user interface element associated with said target location, a location of a file that includes an image displayed in connection with said user interface element, and whether said user interface element is any of enabled, disabled and hidden when displaying a user interface, and wherein said user interface element may be any of a menu, a menu bar, a menu item, a text box, a button, a navigation section including one or more hyperlinks, a hyperlink, a table, a drop-down list, a list box, a check box, a dialog box, a wizard, and a combo box.

In accordance with another aspect of the invention is a computer readable medium comprising code stored thereon for displaying a user interface of an application, the computer readable medium comprising code for: generating a combined property file, said combined property file including a plurality of values for properties of user interface elements of the application obtained from a plurality of individual property value files, said combined property file specifying a first value for a first property of a first user interface element of the application obtained from a first of the plurality of individual property files; and executing said application, wherein said executing said application includes performing first processing comprising: creating said first user interface element, said user first interface element having a set of one or more properties and a default value for each property in said set, said set of one or more properties including said first property; obtaining and processing said combined property file that identifies said first user interface element and specifies said first value for the first property of said set; setting said first property to said first value rather than said default value, wherein if said first value is not specified in said combined property file, said first property is set to said default value; and displaying the user interface including the user interface element in accordance with said first value.

In accordance with another aspect of the invention is a computer readable medium comprising code stored thereon for generating a combined property file, the computer readable medium comprising code stored thereon for: providing a plurality of individual property files, the plurality of individual files specifying a plurality of property values for properties of user interface elements for an application, said plurality of property values including a first value for a first property of a user interface element for the application; and executing a combination property file generator to perform first processing, said first processing including: combining at least a first portion of said plurality of individual property files into the combined property file.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
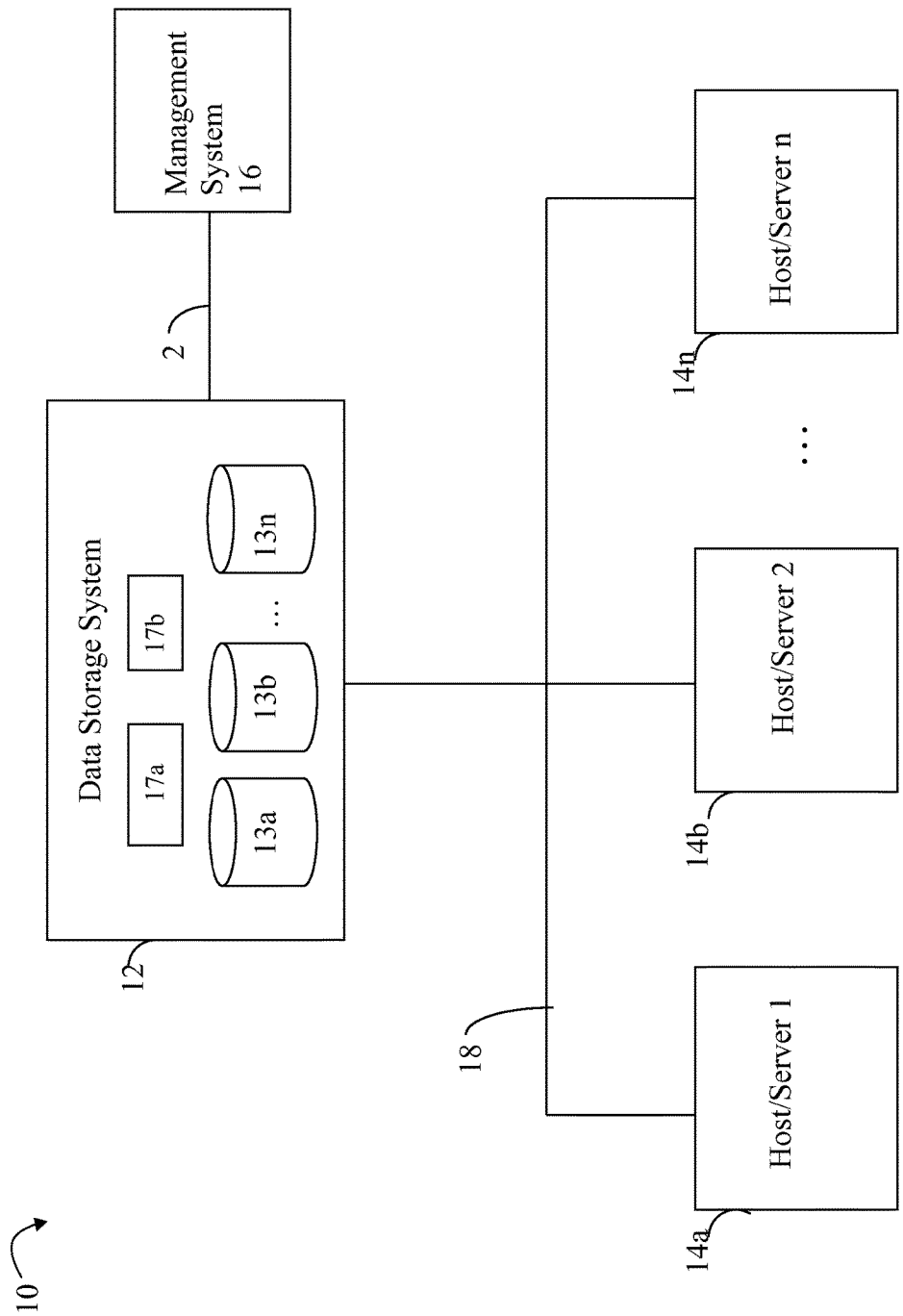
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
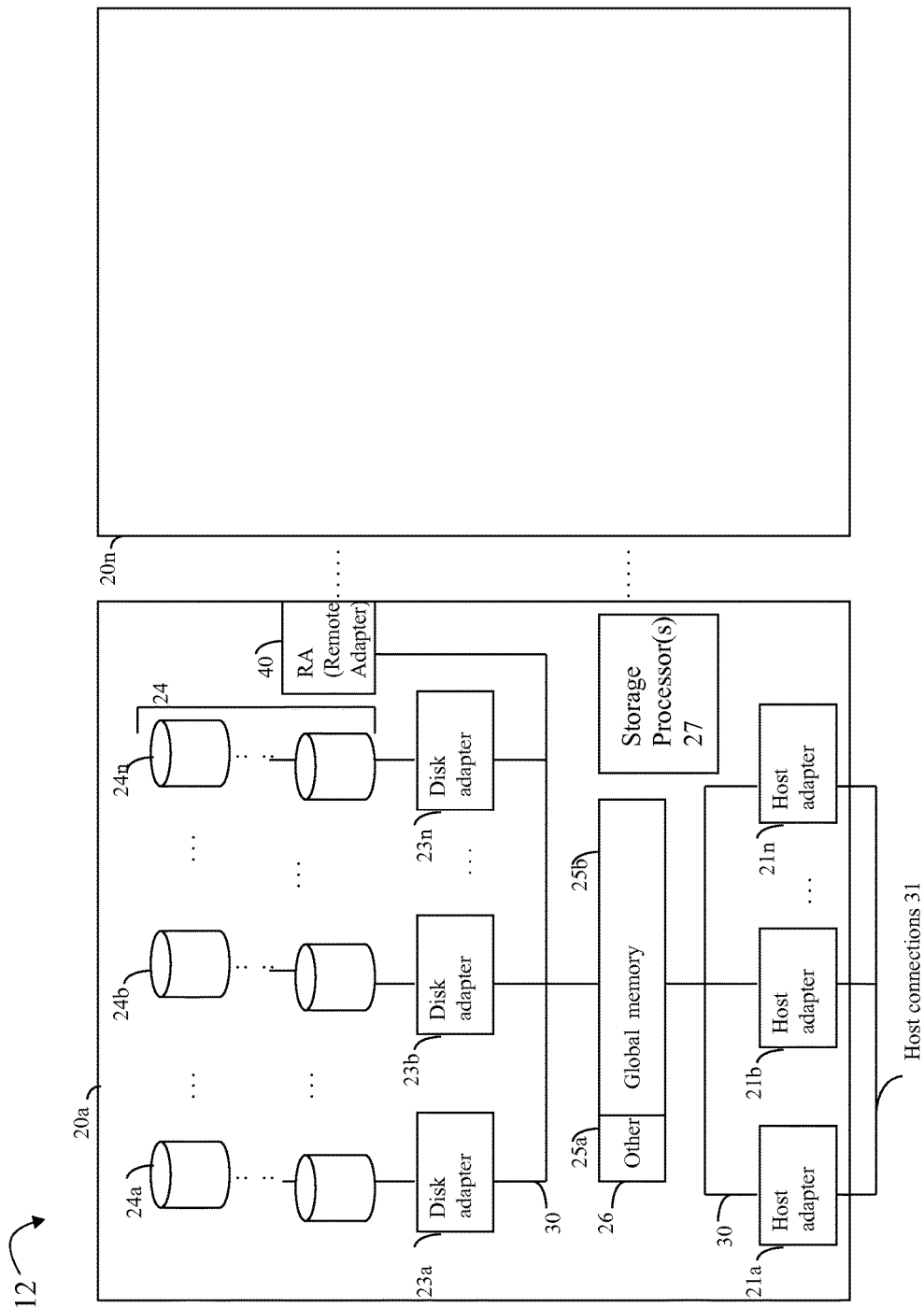
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

A configuration of a data storage system may be described by data storage configuration information. The data storage configuration information may describe various entities, attributes, and the like, about how the physical storage systems and devices are configured such as by a manager or system administrator. For example, the data storage configuration information may identify and describe LUNs, file systems, RAID groups, and the like, as may be formed using the physical data storage of the data storage system. With reference back to FIG. 1 in one embodiment, management software may be executing on the management system 16 where the user may be issuing requests in connection with reading and/or writing data storage configuration information that may be stored on physical storage device of the data storage system 12. More generally, the management system 16 may be referred to as a client issuing requests to the data storage system 12 which acts as a server to service the client requests (e.g., read and write requests) for data storage configuration information.

In general, a storage area network (SAN) may be characterized as a collection of data storage systems that are networked together via a switching fabric to a number of host computer systems operating as servers such as illustrated in FIG. 1.

Data storage management applications may include a graphical user interface (GUI) that enables a network manager to graphically manage, control, and configure various types of hardware and software resources associated with a corresponding managed storage area network and its data storage systems. The management application may execute, for example, on the management system 16 of FIG. 1. The management application may generate a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, the storage management system 16 and associated management software enables a storage administrator (a person responsible for managing the storage network) to manage the storage area network and its resources.

One example of this kind of GUI includes a screen presentation that may include toolbars with accompanying menus and menu items as well as displays such as graphs, tables, maps or trees. The management application providing the GUI may be written in any suitable language such as JavaScript, Flex, and the like.

Described in following paragraphs are techniques that may be used in connection with centralized support for user application controls such as user interface elements of a displayed user interface. Such techniques may be used, for example, in connection with the management and control of user interface characteristics in displaying data storage system information. Although examples and references herein may be made with respect to a GUI of an application for data storage management, more generally, the techniques herein may be used in connection with any suitable user interface (UI) for any application. Using techniques described below, various characteristics and aspects (also referred to herein as properties) of UI elements, such as related to the "look and feel" of a GUI, may be controlled and customized. Look and feel may include aspects of UI elements related to the look or visual appearance of the elements and also the way the user interacts with the UI element (the feel). For example, enabling, disabling or hiding a UI element such as a text box, radio button, menu, and the like, may be characterized in one aspect as affecting the way a user interacts with the UI element. It should be noted that a UI element that a user interacts with may also be known as a control or widget. Aspects related to the look, such as various visual aspects of a UI element, may include, for example, colors, shapes, layout, fonts, font sizes, whether text is italicized, bolded, the image displayed in connection with an icon associated with a UI element, and the like.

In accordance with techniques described herein, an embodiment may use one or more property files which provide for further specifying characteristics of UI elements. Such property files may be included in a defined hierarchy or lookup chain specifying an ordered list in which the property files are read and processed by a look-up service. The files may specify properties of UI elements denoting particular settings of the properties defining characteristics of the UI elements, such as related to the look and feel of the UI elements. The order in which the property files are read affects the order or precedence in which a property obtains its value setting whereby a same property may have a first value in a first property file and the same property may have second value in a second property file. If the first property file is processed in accordance with the look-up chain prior to the second property file, the property may be set to a final value of the second value whereby the subsequent setting of the property to the second value in the second property file overrides the previous first value as specified in the first property file. The property files may be processed at runtime when executing the application thereby provided a means for modifying and customizing UI element characteristics without modifying code of the application. A UI element may be created with a default set of properties and associated values by the application within the application code. When executing the application and processing a property file, any property having a value in a property file may be used to customize or override the default value for the property as specified in the application code, or a previously processed property file. If the property is not provided with an updated value in a property file, the property may retain its default value as may be provided in the application code. In this manner, when there are multiple property files, a layering approach may be provided for customization of property values based on the order in which the multiple property files are processed in the look-up chain. No property file may be required whereby the properties have values as may be specified in the application code. Default values may also be specified in a particular property file. If a property file is specified, the property file may optionally include values for any number of properties which the application permits to be modified using the property file. In the event that multiple property files are processed based on the look-up chain, any property specified as having multiple values in multiple files may retain the value setting of the lastly processed property file in the chain. This is described in more detail in following paragraphs.

Providing for customization of UI elements has many uses, some examples of which are described herein. For example, a vendor may build and release into market an application that is then purchased for resale and/or redistribution such as by another third party. The third party may purchase the application produced by the vendor and the third party may incorporate or bundle the application with the third party's own software and/or hardware. The third party may want to customize UI elements of the application to have a particular look and feel consistent with branding for third party products whereby products sold or distributed by the third party (including the application of the vendor being bundled by the third party) may have a particular look and feel. In this manner, the third party may brand the application for its own purpose such as, for example, to reflect the third party brand by changing displayed text so as to identify the third party, changing displayed icons denoting the third party brand, and the like. Additionally, the third party may want to disable (e.g., such as through greying out a displayed UI element) or otherwise hide (e.g., whereby the UI element is not visible on the UI displayed) particular UI elements, such as buttons, menus, and the like, whereby the default of such UI elements may otherwise be enabled by the application code by default. Whether a particular UI element is enabled, disabled or hidden may depend on the particular functionality provided by the third party. Such customization of aspects of UI elements may be used in connection with one or more third parties in the sale and distribution chain of the application alone, or in combination with, providing customization of aspects of UI elements due to different human languages and dialects as may vary with geographical location (e.g., country or region in a country). This is described in more detail in following paragraphs.

Although exemplary uses herein may be made with reference to particular UI elements, it will be appreciated that techniques herein may be used in connection with any suitable UI element of an interface. UI elements may include, for example, a menu, a menu bar, a menu item, a text box, a button (e.g., radio button, cycle button), a wizard, a navigation section including one or more hyperlinks, a table, a drop-down list, a list box, a check box, a dialog box, and a combo box. Menus allow the user to execute commands by selecting from a list of choices. Menu options are selected, for example, with a mouse or other pointing device within a GUI. A keyboard may also be used. A menu may be, for example, a pull-down menu displayed in response to a user selection. A menu bar may be displayed horizontally across the top of the screen and/or along the tops of some or all windows. A software wizard is a UI type that presents a user with a sequence of dialog boxes that lead the user through a series of well-defined steps. A text box may be a box in which to enter text or numbers. A hyperlink may be displayed as text with some visual indicator (such as underlining and/or color) indicating that selecting the link will result in linking or displaying another screen or page. Properties of a hyperlink may relate to whether the hyperlink is enabled, disabled or hidden. If enabled, the particular path or location identifying a website or the web page may be displayed in response to selection of the hyperlink. A drop-down list may be a list of items from which to select. The list normally only displays items when a special button or indicator is selected. A list box allows a user to select one or more items from a list contained within a static, multiple line text box. A combo-box may be a combination of a drop-down list or list box and a single-line textbox, allowing the user to either type a value directly into the control or choose from the list of existing options. A check box indicates an "on" or "off" state via a check mark ☑ or a cross ☒. A radio butting is similar to a check-box, except that only one item in a group can be selected. Its name comes from the mechanical push-button group on a car radio receiver. Selecting a new item from the group's buttons also deselects the previously selected button. A cycle button is a type of button that cycles its content through two or more values, thus enabling selection of one from a group of items. A table may also be referred to as a grid in which numbers and/or text may be displayed in rows and columns. The foregoing are some examples of UI elements that may be supported in an embodiment in accordance with techniques herein. A UI element may have a property identifying a location of an image or other file used to display an icon associated with the UI element. An icon is a small picture. Icons may be useful, for example, to display an image in connection with branding such as related to a particular vendor or service. A same image may also be associated with a common operation, file type, and the like. For example, a scissors icon may represent a menu option to cut whereby such an icon may be commonly used across many applications from one or more vendors, third parties, and the like, which may sell different applications.

Using techniques herein, UI content (e.g., strings), settings of style-based properties and other properties related to UI controls may be included in one or more property files to provide customization for any suitable purpose including, for example, to provide customization by a vendor of an application, provide customization of the UI by a third party reselling or redistributing the application of another, provide customization for aspects of UI elements such as related to language differences, and the like. An embodiment using techniques herein may provide for such customization of an application's UI after an application has been built and distributed without requiring changes to the application code to provide customizations. Processing may be performed to automatically and dynamically perform a lookup of the correct property files for human language translation as well as for customization by third parties reselling and/or redistributing an application provided by another original application vendor. The one or more property files provide for a generic and centralized ability to enable/disable and/or hide UI controls throughout the application. The one or more property files may include an application-wide unique control identifier to uniquely identify a particular UI element. For such a UI element, the property file may also identify a particular property and a value to which the property is set. This property file is inserted into the lookup procedure and process as described in more detail herein. If there is no entry for a UI element or property of a UI element in the property file, then that UI element is processed/displayed without modification from any default specified by the application code. Techniques herein may be used to generically support the ability to disable or hide any/all UI elements such as by setting the property of a particular UI element to a value denoting the selected state of enabled, disabled or hidden. Generally, the techniques herein may be used to specify a value or setting of any property of a UI element. The properties may include those as described above related to displayed text, display state (e.g., enabled/disable/hide) of a UI element, an ordering of displayed elements or text (left to right, right to left (e.g., may be language dependent or vary with whether a particular language has its text read from left to right or right to left), ordering of menu items such as displayed in pull-down menu, size or physical dimensions of a UI element (e.g., width, height), location/position of button on UI display (e.g., may be an absolute or relative location as displayed), sort ordering of buttons or UI element on screen, ordering or position of displayed text in table, listing of UI elements, and the like.

Figure 3:
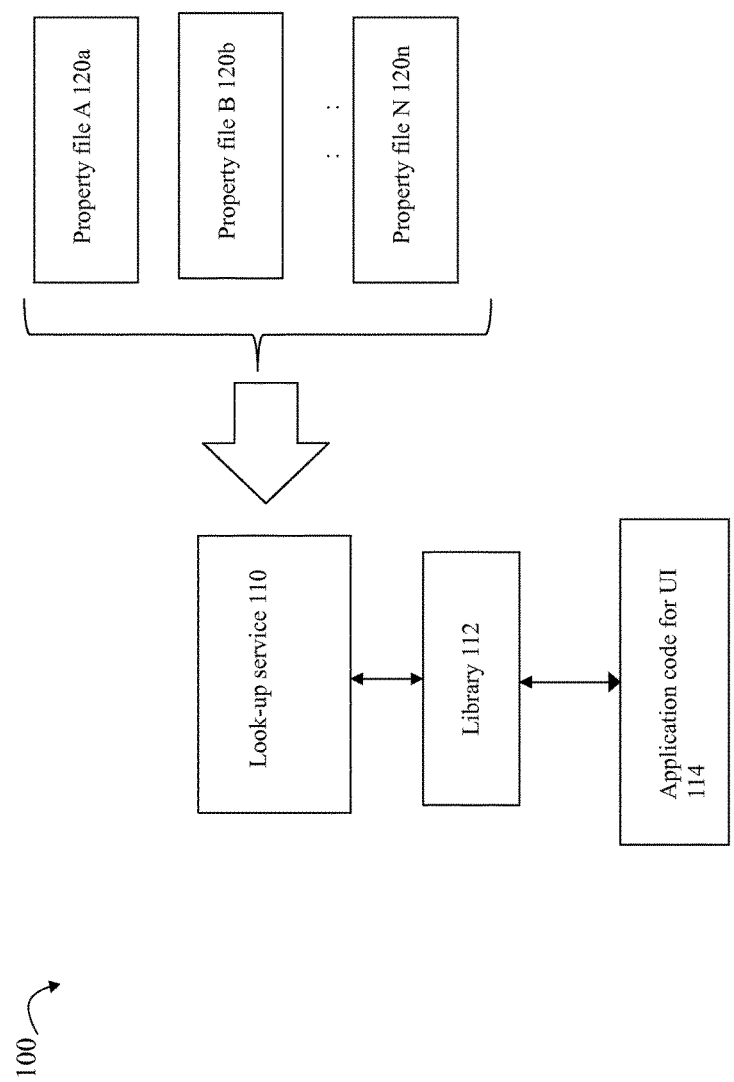
FIGS. 3 and 12 are examples of components that may be included in embodiments in accordance with techniques herein.

Referring to FIG. 3, shown is an example of components that may be included in an embodiment in accordance with techniques herein. The components of the example 100 may be included a management system 16 for an application and its UI used in connection with management of data storage system(s). The example 100 includes application code 114 which includes code for rendering a UI, a library 112, and a look-up service 110. The application code 114 may be linked against a library 112 of routines or methods which are invoked in connection with displaying UI elements of a GUI of the application code 114. In turn, code of the library 112 communicates with the look-up service 110 which is a runtime look-up service that reads and processes property files 120a-120n based on a look-up chain of property files providing a predefined or predetermined ordering in which the property files are processed by the look-up service 110. At runtime, information may be returned from 110 to 112 and then from 112 to 114 as illustrated.

The property files 120a-120n may include content and, more generally, values for properties affecting the manner in which UI elements of a UI are displayed and operate. The content may include, for example, values for strings, icons such as images, and the like. When there is a desire to possibly vary such content, an embodiment may partition the content and other property settings of the UI elements from other code that may be used to render the UI. Furthermore, an embodiment may provide support for multiple property files 120a-120n to be used with the UI. For example, the UI may include multi-lingual support providing for customized language-dependent UI elements depending on the particular language of the country or locality. In this manner, support in the UI may be included for multiple different language by having a different property file for each particular language-dependent UI elements such as displayed text in a particular language. In this case, there may be a defined look-up chain or prioritized list of property files that may exist for use in connection with defining elements and values displayed in connection with a UI for the application Each of the properties files may have a name formed from predetermined naming conventions. For example, a property file may have a name formed based on the following pattern:

APP_XX_YY.PROP whereby APP denotes the application, XX is a two letter coding denoting a particular language and YY is a two letter coding denoting a particular country. To further illustrate, there may be default or first language property file for English as used in the US named APP_EN_US.PROP which includes UI language dependent content elements specified in English. Similarly, the name of a property file including French content or UI dependent language elements for use in countries such as France may be APP_FR_FR.PROP based on such predetermined naming conventions.

In connection with the foregoing naming convention, a defined hierarchy or order of precedence may be defined for the different possible property file names indicating the order in which content, such as a value for a string or image for an icon, is determined by the UI. For example, there may be a first property file such as APP_EN_US.PROP. The look-up chain may provide for optionally specifying and using one or more other property files which may override values and definitions of the foregoing first file. The above-mentioned French property file of APP_FR_FR.PROP may be an example of an optional property file of the defined look-up chain whereby any values specified in the French file may override or replace values of the English file (e.g., first property file). Code of the UI may always look for and utilize the default English property file. Additionally, for example, if the UI is executing in a particular country or based on particular language or country configurations settings for the UI, processing may also form the name of a second property file, such as the French property file, based on the predetermined file naming conventions for the desired language and country. Processing may be performed such as by the look-up service 110 to attempt to locate the second property file in one or more expected or known locations (e.g., particular devices and/or directories). If the second property file exists, the UI may use the combination of values of both the first property file and the second property file in defining elements of the UI. If there is any conflict between a value in the first and second property files, the value specified in the second property file overrides that specified in the first property file. For example, the first property file may specify a value for a string or tag in English displayed in the UI such as for a label in a menu or menu item, content of a button, and the like. The second property file may also specify a value for the same UI element property but in French. If the second property file exists, the UI uses the property value for the UI element of the second property file. Otherwise, if the second property file does not exist, the UI uses the property value of the UI element value of the first property file. It should be noted that if there is no property files or any one or more property files are empty, the UI elements may retain any default settings for the property values as specified within the application code 114 and/or library 112.

It should be noted that for simplicity of illustration, the above-noted naming convention for a property file may provide support for a single lookup chain of property files per application. As will be appreciated by those skilled in the art, an embodiment may provide support for having multiple independent lookup chains of property files per application using a different suitable naming convention. For example, the following may denote a property file naming convention pattern for an application for multiple lookup chains of property files:

APP_CHAINP_XX_YY.PROP where APP, XX and YY are as described above and elsewhere herein and CHAINP denotes a particular lookup chain of property files whereby each lookup chain may be uniquely associated with a different "P" as included in "CHAINP" (e.g., P may be an integer uniquely identifying a particular lookup chain of property files where each chain has its own possible variant of property files for language variation and customizations, distribution and/or sales chain customizations as described elsewhere herein, and the like). More generally, a predefined pattern denoting the property file names may or may not include a portion denoting the application.

In connection with multiple independent lookup chains per application, consider the following example. An application may include multiple code entities such as multiple dialogues, wizards, and the like each requiring its own customized property values. By providing multiple independent lookup chains for a single application, a portion of the property files may be processed in a different look-up chain for each code entity of the application. For example, the application APP1 may include dialogues D1 and D2. Property files processed in connection with a first lookup chain to determine customized property values for use with D1 of APP1 may be those property files having the form APP1_CHAIN1_XX_YY.PROP (wherein a value of P=1 as used with CHAINP denotes D1). Additionally, property files processed in connection with a second lookup chain to determine customized property values for use with D2 of APP1 may be those property files having the form APP1_CHAIN2_XX_YY.PROP (wherein a value of P=2 as used with CHAINP denotes D2).

In addition to defining a look-up chain of predetermined property files providing for language and/or geographic customizations, the look-up chain may also include one or more property files providing for UI element customization by one or more entities of the distribution and/or sales chain of the application. For example, as described elsewhere herein, a vendor may be a first vendor that builds and releases the application 114. The application 114 may be purchased by a second vendor which bundles the application with other hardware and/or software which is then sold to a customer or perhaps yet another third vendor. The look-up chain may allow for each of the first vendor, second vendor, and any other vendor in the distribution or sales chain of the application to provide one or more property files customizing UI elements. For example, the look-up chain may include a predetermined sequence of property file names whereby the first vendor and the second vendor may optionally provide a property file for each possible geographic location or language variant. In this manner, the look-up service 110 may always look for each file in the predetermined sequence of possible property files.

As noted above, APP_XX_YY.PROP may denote that naming convention for the property file(s) provided by the first vendor. Each additional vendor (denoted "Vn" where "n" is an integer denoting the next vendor in the sales or distribution chain) in the look-up chain may provide property files of the general form APP_XX_YY_Vn.PROP. To further illustrate for the example where there are the above-mentioned first and second vendors, assume that each such vendor may provide for UI customization for two countries—the US and for France. The look-up chain may be configured to include four files based on the above-noted file naming convention:

1. APP_EN_US.PROP /* denoting the first vendor's US customization property file */
2. APP_EN_US_V2.PROP /* denoting the second vendor's US customization property file */
3. APP_FR_FR.PROP /* denoting the first vendor's French customization property file */
4. APP_FR_FR_V2.PROP /* denoting the second vendor's French customization property file*/

Such a look-up chain of property files may be represented by property files 120a-120n whereby the look-up chain of property files is traversed in the order from 1 through 4 at runtime by the look-up service 110. In this example, if the application is used in the US, the look-up service may not look for any French language property files (3 and 4 above) and only look for English language property files 1 and 2 above. If the application is used in France, the look-up service may utilize a look-up chain including all 4 files and attempt to locate all four property files (1-4 above). In this manner, any property values included in the fourth property file APP_FR_FR_V2.PROP by the second vendor may override any other UI customizations provided by the first vendor and may also override any other UI customizations provided for by the US or English variations of either vendor.

In connection with the foregoing example, the look-up chain may represent a prioritized ordering of property files, such as files 1-4, whereby if two different property files both specify a different value for the same property, the value assigned to the property in the file that occurs the latest in the lookup chain is the final resulting property value. Thus, the value assigned to the property in the latest occurring file in the look-up chain overrides any previous value assignments for the same property. In this manner, the look-up chain may define a prioritized ordering of multiple property files whereby a second file that occurs after a first file in the ordering may have a higher priority in that any values for properties in the second file may override values for the same properties occurring in the first file. The foregoing describes a processing order in which the property files may be traversed in terms of increasing priority so that all property files are traversed. Rather than perform processing whereby all property files are traversed in the look-up chain in the foregoing increasing prioritized ordering, an embodiment may alternatively process the property files in the reverse ordering (e.g., from highest to lowest priority). If a value for a property is determined by traversing the property files in order from highest to lowest priority, processing may not require traversing all property files in that processing performed to determine a value for a particular property may stop as soon as a first property value assignment for the particular property has been located in one of the property files. It should be noted that this property file processing order from highest to lowest priority may be generally performed in connection with any examples as described herein although processing may also be described in connection with processing property files from the lowest to the highest priority.

In connection with the foregoing example, it should be noted that only a single language is associated with each of the countries of France and the US for each of the vendors. However, based on the predetermined property file naming convention described above, an embodiment may provide for multiple language customizations for each vendor through multiple property files for a single country. For example, for the US, English and Spanish UI customizations may be provided by the first vendor through two different property files, respectively, APP_US_EN.PROP (English UI property value customizations) and APP_US_SP.PROP (Spanish UI property value customizations).

It should be noted that any number of possible property files may be included in the look-up chain for any number of vendors, or more generally, entities, in the sales or distribution chain of the application. Additionally, each such entity in the distribution or sales chain may be allowed to provide one or more property files for use such as based on language or geographic customizations as well as for other purposes.

Referring back to FIG. 3, the look-up service 110 may provide property value information at runtime to the library 112 which is, in turn, provided to the application code's UI when rendering a page for display. The code 114 may call a method or routine in the library 112 which, in turn, invokes the look-up service 110 at runtime to determine properties for particular UI elements being displayed for the application's UI. The look-up service 110 may use the information obtained from the one or more property files 120a-120n. For example, the look-up service 110 may attempt to locate and read the contents of the four property files as noted above.

The service 110 may process the property files based on the predetermined ordering of the look-up chain and may determine a resulting property value for any property defined in one or more property files.

Each UI element may be uniquely identified by a unique identifier (ID) associated with the particular UI element. A particular property may be referenced for a UI element as ID. property. In some embodiments, the property file may specify or assign a value to a property using name-value pairing such as ID.Property=value. When the application code inquires or queries regarding different property values from the library and the look-up service, the APIs (application programming interfaces) defined between 114 and 112 and/or 112 and 110 may allow an inquiry regarding all properties of a particular UI element by specifying just the ID without identifying any particular property. The API may also return a value for one or more particular properties by allowing requests for particular instances of ID.property1, ID.property2, and the like. Additionally, property values returned may be in any suitable form based on the defined API. The property values returned for an ID may be, for example, in the form of a string of all properties having a value obtained from the one or more property files.

It should be noted that if a property is not specified in one of the property files, a null may be returned for that property from the look-up service 110 to the library 112 meaning that there is no change to any default value as may be specified by the application code 114 and/or library 112. In this manner, an embodiment may have the application code 114 and/or library 112 provide a default value in the case where no value for a property is specified in one of the property files. As a variation, consider a second option whereby if no property values is specified for a given property in one of the property files, the look-up service 110 may provide a default value (e.g., from another source such as a separate default file, as may be encoded in the logic of the look-up service code, and the like). As another third option, an embodiment may always include at least one property file which may have the lowest or least priority in the look-up chain which provides default property values. In this manner with the third option, default property values may be provided using a default property file having the lowest or least priority in the look-up chain and any second property file that specifies a value for a same property also included in the default property file overrides the value of the default property file (e.g., all other property files have a higher priority in the look-up chain than the default property file).

As a further illustration, an application developer may create a dialog or other code 114 which is executed in connection with an application GUI. The code 114 may include UI elements defined in a base class by the library 112. The developer code 114 may use such UI elements in connection with creating and rendering a GUI. For example, a UI element included in a class of the library 112 may be a button, EMC_button, having a particular ID which is initialized when rendering the UI. An instance of EMC_Button may be referenced in the developer code 114 as a UI element. The library 112 may be linked and loaded for use with the developer code 114. The developer code 114 may create an instance of an object of the class EMC_Button for use in the developer's UI. Changes affecting properties of such UI elements utilized by the developer code (application) may be made using one or more property files. As part of initialization of the UI element of class EMC_Button, a method or routine "init" of the library 112 supplied for use by the developer code 114 may be invoked to retrieve the properties of the UI element prior to rendering the instance of the UI element, EMC_Button, on a display. The library init routine or method may invoke the lookup service to obtain one or more property values for the UI element. The following may represent a pseudo-code like representation of code included in the library 112 for processing performed in connection with the above-mentioned init method or routine which may be implicitly invoked as part of initializing a UI element displayed by the application or developer code 114. The following provides for returning a single property value of size but may be generalized to return multiple different property values from the look-up service init ID

```
{
   string.size=lookupservice.get_property(ID+"size");  /*
      another method which calls lookup service where
      "size" is the property name **/
   if string.size !=NULL
   {
     set ID.size=size;
   }
   else
   {
     set ID.size=default_size;
   }
   return (string.size)
}
```

The developer or application code may create an instance of an object of the class EMC_Button for use in the developer's UI. Value changes affecting properties of such UI elements like instances of EMC_Button utilized by the developer code (application) may be made using the one or more property files 120a-n processed at runtime. In this manner, a vendor may ship an application with a UI 114 which uses the library 112. A third party may be allowed to further customize UI elements of the application through the use of a customized third party supplied property file of the look-up chain since the property file may be read in by the lookup service at runtime when executing the application. In this manner, changes (such as customized by the third party) may be made to the displayed UI elements of the application after the application is distributed by the original vendor without making further changes to the application code.

It should be noted in the above snippet for init, the library routine or method init may specify a default value if there is no value specified in any of the property files. However, it should be noted that other code included in the application may also provide or specify such a default value should no other value be specified in any of the property files.

What will now be described in following paragraphs are additional exemplary uses of the techniques herein using property files for UI customization as may be performed by an embodiment.

Figure 4:
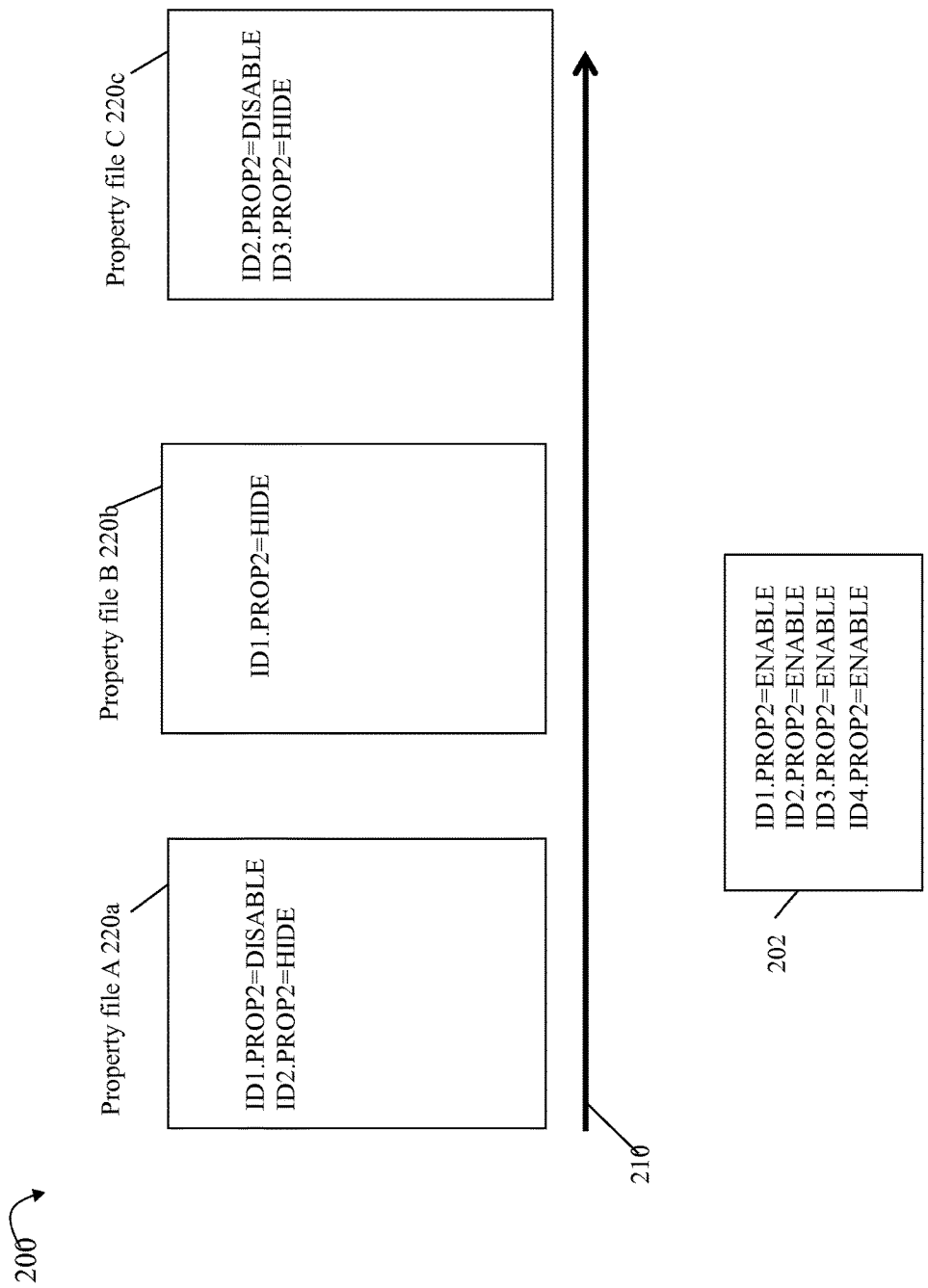
FIGS. 4-8 illustrate examples of property files and UIs in an embodiment in accordance with techniques herein.

Referring to FIG. 4, shown is an example 200 including 3 property files 220a-c included in the look-up chain of property files read and processed by the look-up service 110 of FIG. 3. Directional arrow 210 may illustrate the predetermined left to right ordering in which the property files 220a-c are processed (e.g., property file A 220a is first processed, followed by property file B 220b which is then followed by property file C 220c). In this manner, property values in 220c may override any of the same property values specified in 220b and 220a. Furthermore, if a property value is specified for a property in 220a and 220b but not 220c, the value of 220b is the final resulting property value. A UI element is denoted by a unique ID. In this example, there are four UI elements denoted by ID1, ID2, ID3 and ID4. A particular property (PROPn) of a UI element (having IDn) is denoted as "IDn. PROPn". Property values may be specified using key-value pairs. For example, property PROPn of a UI element having IDX may be assigned a value VAL in the property file as follows: IDX.PROPn=VAL.

Element 202 may identify default values specified for different properties of each of the four UI elements ID1-ID4. Such default values of 202 may be defined by the application code 114 and/or library 112 if property values are not otherwise specified in any of the property files 220a-220c. In this example, each of the UI elements may have a first property, PROP2, denoting a display state of the corresponding UI element as one of enabled (ENABLE), disabled (DISABLE) or hidden (HIDE). By default as denoted by 202, all four UI elements may be enabled. When a UI element is enabled, it is displayed in the UI and active. When a UI element is disabled, it may be displayed in the UI (such as a greyed out UI element) but is not active or available for user interaction. When a UI element is hidden, it does not appear in the displayed UI. For UI element ID1, the property value for ID1. PROP2 is determined by first retrieving the value of DISABLE from property file 220a and the second value of HIDE from property file 220b. Although property file 220c exists, it does not specify any property value for ID1.PROP2 and therefore the final resulting value for ID1. PROP2 is HIDE (as specified in file 220b).

For UI element ID2, the property value for ID2. PROP2 is determined by first retrieving the value of HIDE from property file 220a and the second value of DISABLE from property file 220c. Although property file 220b exists, it does not specify any property value for ID2.PROP2 and therefore the final resulting value for ID2. PROP2 is DISABLE (as specified in file 220c).

For UI element ID3, the property value for ID3. PROP2 is determined by retrieving the value of HIDE from property file 220c. Although property files 220a and 220b exist, these property files do not specify any property value for ID3.PROP2 and therefore the final resulting value for ID3. PROP2 is HIDE (as specified in file 220c).

For UI element ID4, the property value for ID4. PROP2 is the default value of ENABLE as specified in 202. Although the property files 220a-220c exist, none of these files specify a property value for ID4.PROP2 and therefore the final resulting value for ID4. PROP2 is ENABLE (as specified in 202).

As mentioned elsewhere herein, in connection with the foregoing example of FIG. 4, the look-up chain denoted by element 210 may represent a prioritized ordering of property files, whereby if two different property files both specify a different value for the same property, the value assigned to the property in the file that occurs the latest in the lookup chain is the final resulting property value. Thus, the value assigned to the property in the latest occurring file in the look-up chain overrides any previous value assignments for the same property. In this manner, the look-up chain may define a prioritized ordering of multiple property files whereby a second file that occurs after a first file in the ordering may have a higher priority in that any values for properties in the second file may override values for the same properties occurring in the first file. The foregoing describes a processing order in which the property files may be traversed in terms of increasing priority so that all property files are traversed. Rather than perform processing whereby all property files are traversed in the look-up chain in the foregoing increasing prioritized ordering (e.g., such as illustrated by 210), an embodiment may alternatively process the property files in the reverse ordering (e.g., from highest to lowest priority thereby in a reverse ordering from that illustrated by 210). If a value for a property is determined by traversing the property files in order from highest to lowest priority, processing may not require traversing all property files in that processing performed to determine a value for a particular property may stop as soon as a first property value assignment for the particular property has been located in one of the property files. It should be noted that this property file processing order from highest to lowest priority may be generally performed in connection with any examples as described herein although processing may also be described in connection with processing property files from the lowest to the highest priority.

Figure 5:
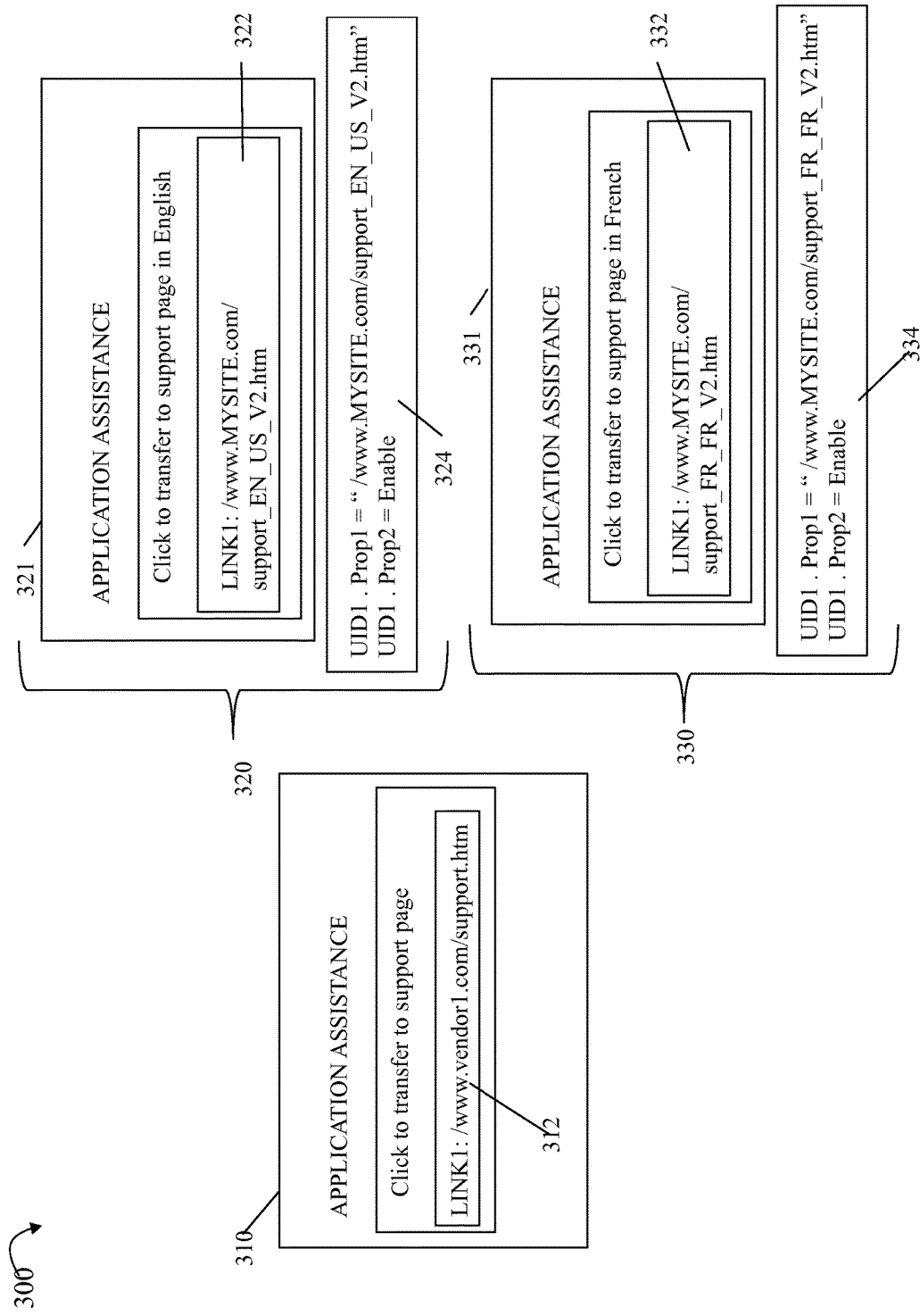

As another example, reference is made to FIG. 5. In the example 300 of FIG. 5, a UI may include a button or other UI element 312 providing a link to a support page. By selecting the UI element 312, the user may then be linked to another location providing the support page, for example, with resources and information for support assistance with the application. For this example, assume there is a first vendor1 and a second vendor 2 in the sales and/or distribution chain. Vendor 1 may supply an application which is purchased for resale and/or redistribution by vendor 2. Thus, vendor 2 may customize aspects of the UI for the application using techniques herein by specifying property values in a property file.

Element 310 may illustrate a screenshot of a UI including a UI element 312 providing a hyperlink to a location of a web support page for vendor 1. If no customization is made by vendor 2, element 310 illustrates the default UI displayed. Upon selection of the hyperlink 312, the user will be linked to the web page—/www.vendor1.com/support.htm—at vendor 1's website. The web page www.vendor1.com/support.htm is processed and displayed as the support page by default. UI element 312 may have a unique UI element identifier of UID1 with two properties—Prop 1 identifying the location of the webpage processed in response to selection of the UI element and Prop2 specifying a display state of enable, disable or hidden for the UI element 312.

Vendor 2, however, provides UI customizations for both the US in English and also for France in French using two property files included in the look-up chain. Element 320 includes a screenshot 321 of a UI customized using property values included in a first property file 324 for the US English variation by vendor 2. In this example 320, the displayed UI provides for transfer of control or display of a different support web page of the second vendor (rather than the first vendor) in English at www.MYSITE.com/support_EN_US_V2.htm.

Element 330 includes a screenshot 331 of a UI customized using property values included in a second property file 334 for the French variation by vendor 2. In this example 330, the displayed UI provides for transfer of control or display of a different support web page of the second vendor (rather than the first vendor) in French at www.MYSITE.com/support_FR_FR_V2.htm.

Figure 6:
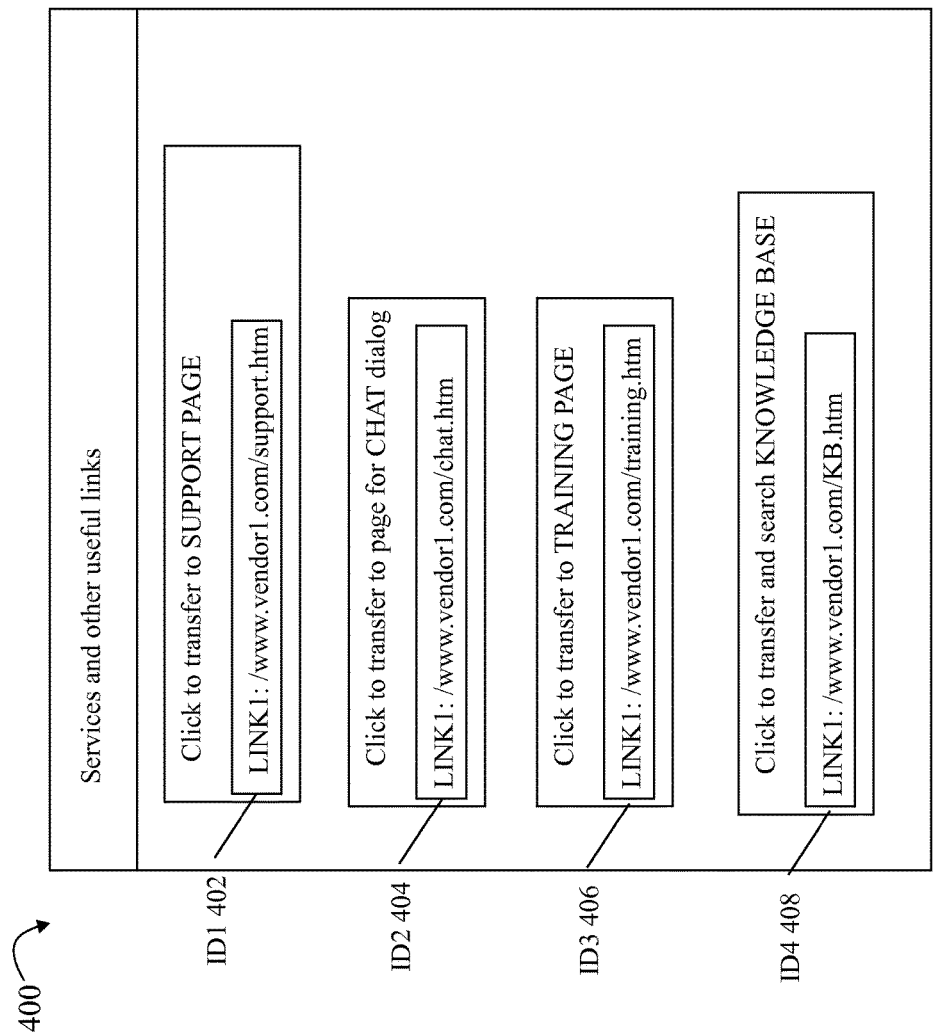
Figure 7:
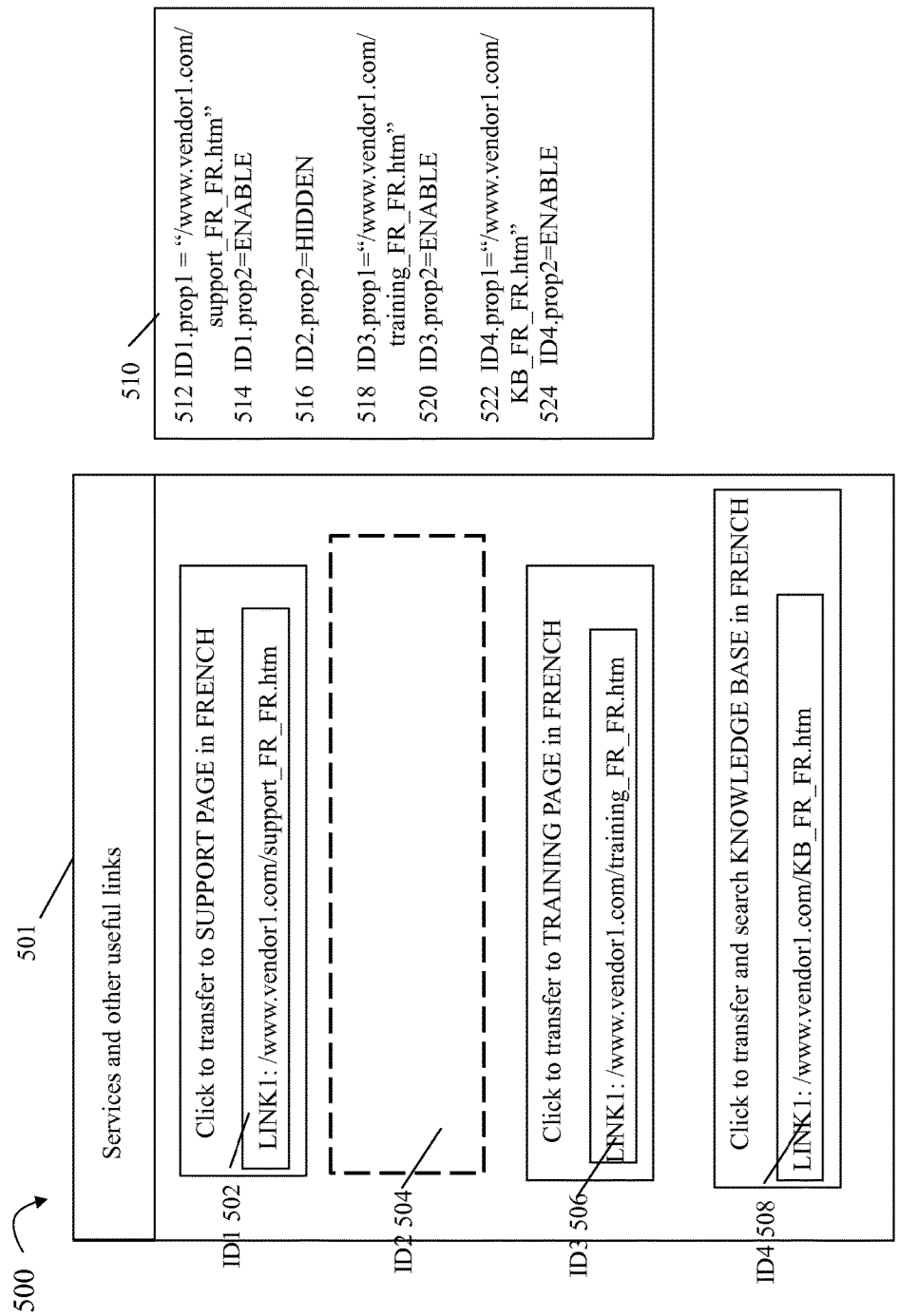
Figure 8:
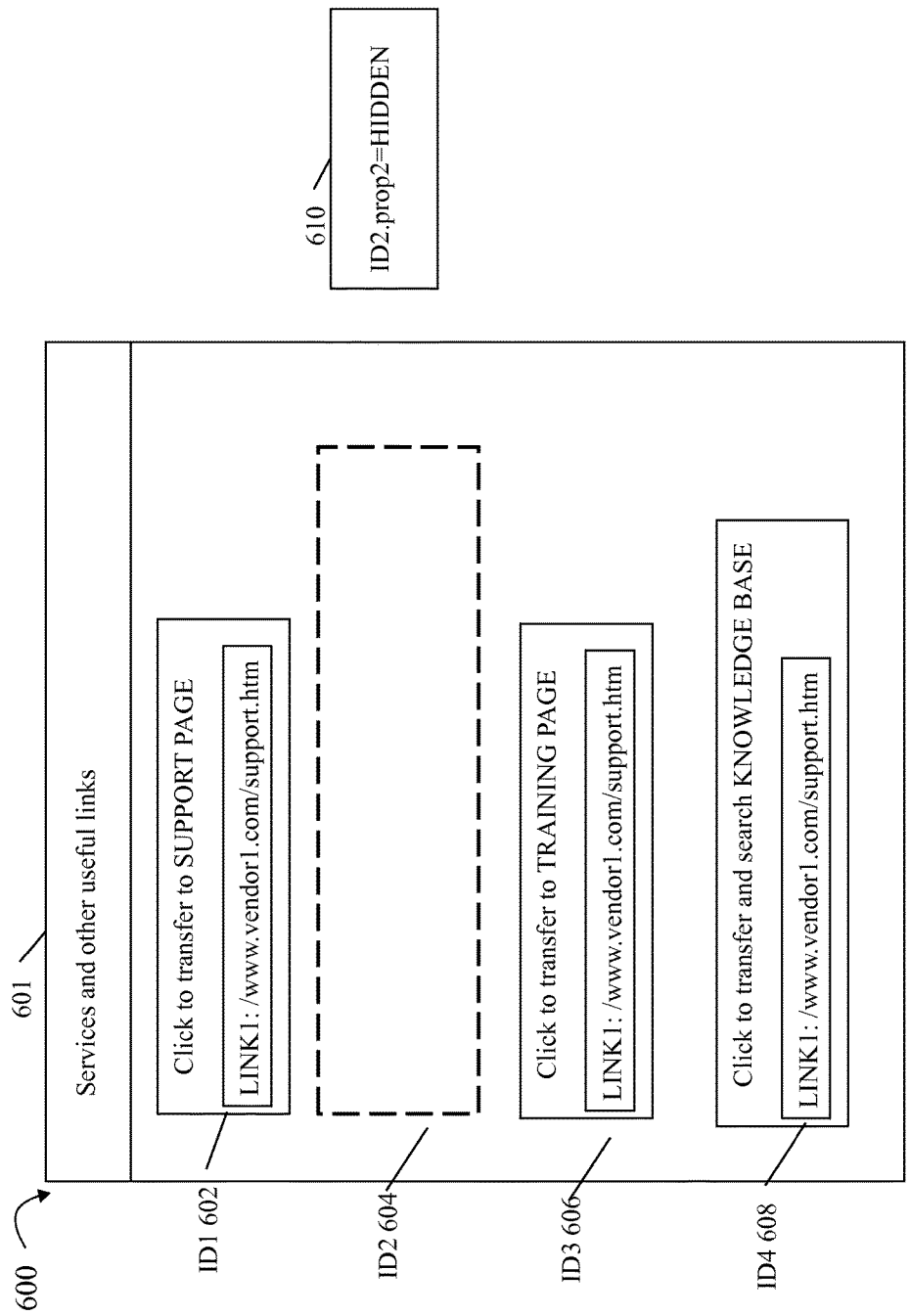

As another example, reference is made to FIGS. 6, 7, and 8. Referring first to FIG. 6, shown is a screenshot of a UI displayed with default values provided by the first vendor of an application. The displayed UI may include 4 UI elements denoted as ID1 402, ID2 404, ID3 406, and ID4 408 providing links to a support page as well as other useful links to pages including information related to the application provided by vendor 1. Each of the UI elements 402, 404 406 and 408 may have a unique UI element identifier and include two properties—Prop 1 identifying the location of the web-page processed in response to selection of the UI element and Prop2 specifying a display state of enable, disable or hidden for the UI element.

ID1 402 may be a UI element providing a link to a support page such as described above. ID2 may be a UI element providing a link to a page for a CHAT dialog. The CHAT dialog may provide for live chat interaction between a user and an agent or other support personnel such as for information regarding product sales, problems and trouble shooting, and the like. Thus, it may be that such a CHAT dialog is conducted in a particular language such as French or English. ID3 406 may be a UI element providing a link to a training page such as listing training classes offered by vendor 1 relate to the application and/or another product. ID4 408 may be a UI element providing a link to a knowledge base where a user may, for example, type in a question or key words used as query search terms for searching the knowledge base (e.g., database) of information. Such searching may be performed, for example, by a user wishing to retrieve information regarding a particular problem or topic of interest such as may be related to the application.

In this example, all UI elements 402, 404, 406 and 408 transfer control to a particular web page at vendor 1's website by default and are enabled.

With reference now to FIG. 7, vendor 1 may also include a language variant customization of the UI for French. Element 501 illustrates a customized version of the screenshot from FIG. 6 for French. The UI customizations may be specified using a property file 510 provided by vendor 1 which, when applied with the application's UI, results in a customized display of the UI 501. In this example, note that elements 512, 518, and 522 specify links to web pages that may be written in French or otherwise include customized variations particular to France or in the French language. Element 516 denotes that UI element ID2 504 is HIDDEN and therefore does not appear in the displayed UI. ID2 may be a UI element associated with a hyperlink for CHAT support. However, vendor 1 may not provide chat support in the French language. For example, vendor 1 may not employ French-speaking agents or other personnel for chat support service. Thus, when displaying the UI 501 in France as used by the French language user, UI element ID2 504 may be hidden as denoted by the italicized rectangle.

With reference now to FIG. 8, vendor 2 as described above may resell vendor 1's application and may only provide UI customizations for the US in English. Vendor 2 may not include a property file variant for UI customization in France or based on the French language. Thus, vendor 2 may include a single property file including content denoted by 610. In this example, vendor 2 does not offer chat service and wants to direct users to vendor 1's website and associated web pages as illustrated in the default screenshot of FIG. 6. Element 601 may denote the customized UI by vendor 2 as just described obtained by applying the property file 610.

It should be noted that the techniques herein may be utilized in an embodiment having a look-up chain of one or more property files including as few as a single property file or any number of property files.

What will now be described are techniques for generation and use of combined property files. A combined property file as described in more detail below may be generally characterized as including property values for properties of user interface elements obtained from multiple individual property files. Individual property files may be those property files described above such as, for example, elements 120a-n of FIG. 3. It may be desirable in some instances to allow initial creation of individual property files, such as for software development purposes, and then use techniques herein when preparing or building software components for a release to generate a combined property file to replace multiple individual property files. In this manner, the software components of the release may include the combined property file rather than the multiple individual property files. In one exemplary use, the techniques herein may be used when preparing a release build of software components that are shipped as a released version of a software product whereby the combined property file may be created and included in the released product as a software component rather than include the individual property files. Without use of combined property files, a customer's installed system may be populated with the many individual property files. Additionally, without use of combined property files, all the individual property files are requested by the look-up service (e.g., see element 110 of FIG. 3), thereby having to issue multiple requests for all individual property files. The multiple requests may be undesirable such as due to the overhead in making such requests. In contrast, an embodiment may use techniques herein to generate a combined property file replacing the multiple individual property files. In this manner, a single request for the combined property file may replace the multiple requests for the individual property files.

Figure 9:
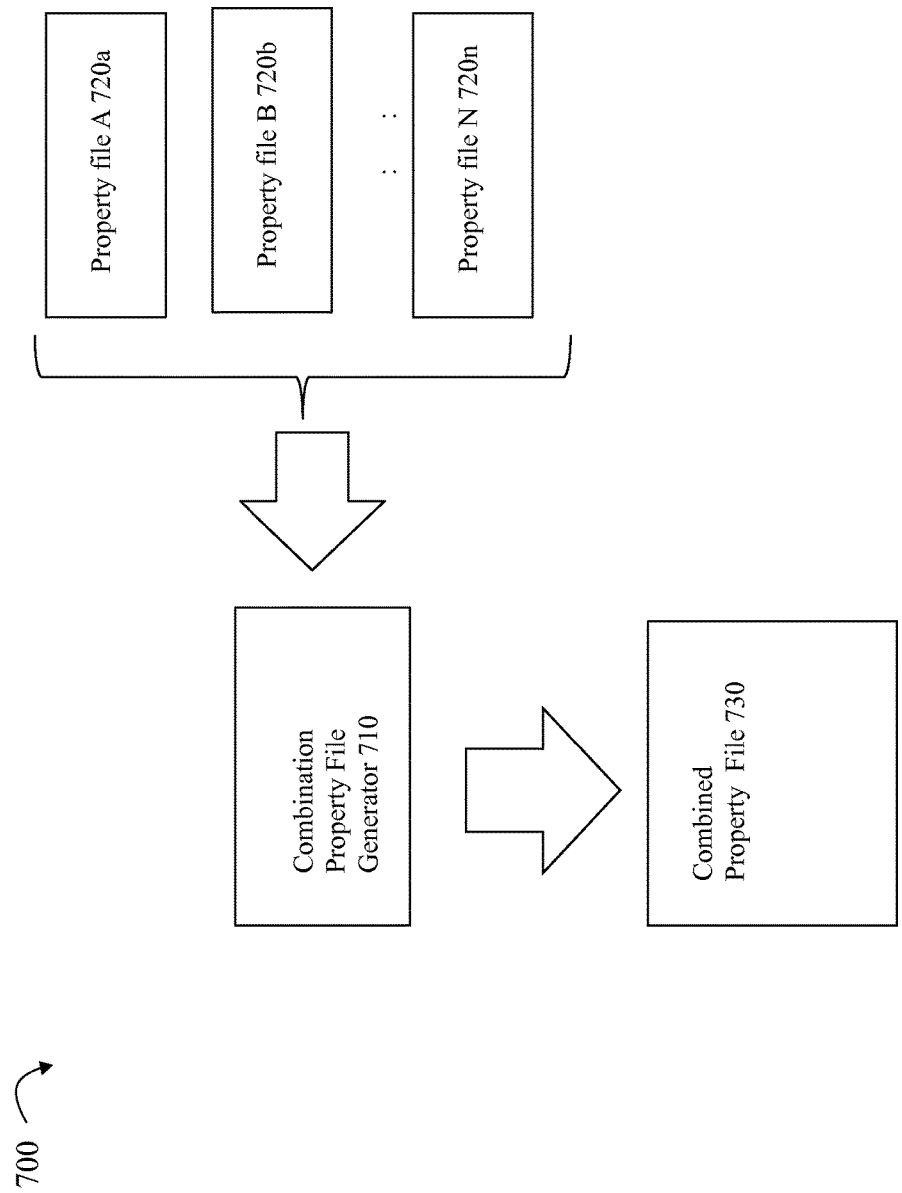
FIGS. 9, 9A and 9B are examples illustrating generation of combined property files in an embodiment in accordance with techniques herein.

Referring to FIG. 9, shown is an example 700 of components that may be used in connection with techniques herein to generate a combined property file. The combined property file generator 710 may be a code module that is executed to perform processing which reads in multiple property files 720a-720n and generates a combined property file 730. The combined property file 730 includes all the information from the individual property files 720a-720n. Each of the property files 720a-720n may include name-value pairs specifying different values for different properties used in connection with different UI elements as described elsewhere herein. The combined property file 730 may have any suitable format. Examples of some suitable formats for the combined property file 730 are described in more detail in following paragraphs.

It should be noted that the generator 710 may combine various selected ones of the property files having any suitable naming convention. For example, as described above, property files may be named in accordance with a predetermined property file naming convention pattern for an application for multiple lookup chains of property files such as:

APP_XX_YY_Vn.PROP where APP may denote a number of one or more characters associated with identifying a particular application, XX is a two letter coding denoting a particular language, YY is a two letter coding denoting a particular country, and Vn denotes property files provided by a particular vendor denoted by "n". In connection with Vn as described elsewhere herein, "n" may be an integer such as greater than zero and each vendor may be uniquely identified using a different integer value for "n".

Figure 9A:
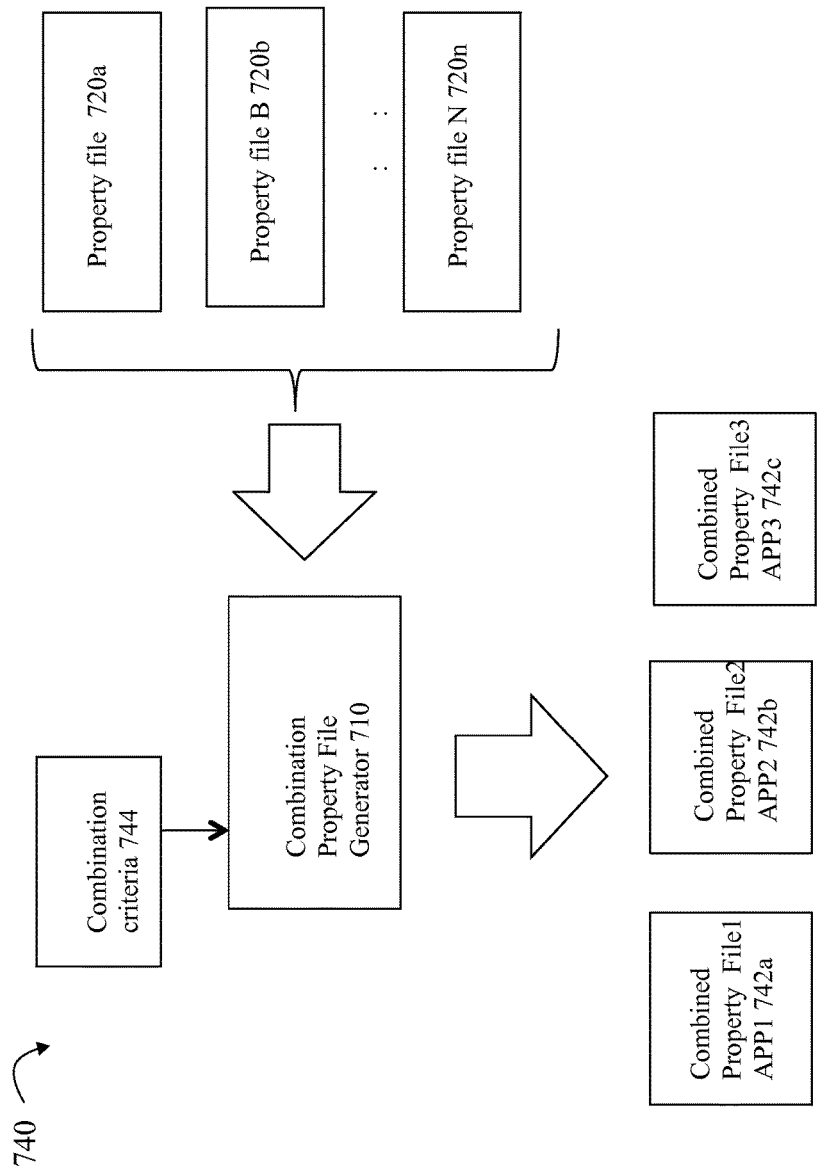

With reference to FIG. 9A, the generator 710 may combine a selected portion of property files 720a-n based on combination criteria 744 identifying one or more of property files 720a-720n to be combined. The combination criteria 744 may be provided as an input to the generator 710. Assume that the set of property files 720a-n includes property files for 3 applications, APP1, APP2 and APP3, based on the above-mentioned naming pattern. Property files used in connection with properties for the first application, APP1, may have names of the general form APP1_XX_YY_Vn.PROP. Similarly, property files for the second application, APP2, may have names of the general form APP2_XX_YY_Vn.PROP, and property files for the third application, APP3, may have names of the general form APP3_XX_YY_Vn.PROP.

As a first example, the generator 710 may receive combination criteria 744 to generate 3 different combination files 742a-c. The combination criteria 744 may include information to combine a first portion of the property files 720a-n for APP1 into a first combined property file 742a, to combine a second portion of the property files 720a-n for APP2 into a second combined property file 742b, and to combine a third portion of the property files 720a-n for APP3 into a third combined property file 742c. To generate the combined property file a 742a for APP1, the combination criteria 744 may identify such property files as all those having APP1 as the first portion of the property file name. The property files for APP1 may be expressed as those having the naming convention APP_XX_YY._Vn.PROP. In terms of regular expression notation, the property files for APP1 may be expressed as those having the naming convention APP1*.PROP. In a similar manner, the combination criteria may include information identifying selected ones of the property files 720a-n to be combined respectively, for APP2 into the combined property file2 742b and for APP3 into the combined property file2 742c.

Figure 9B:
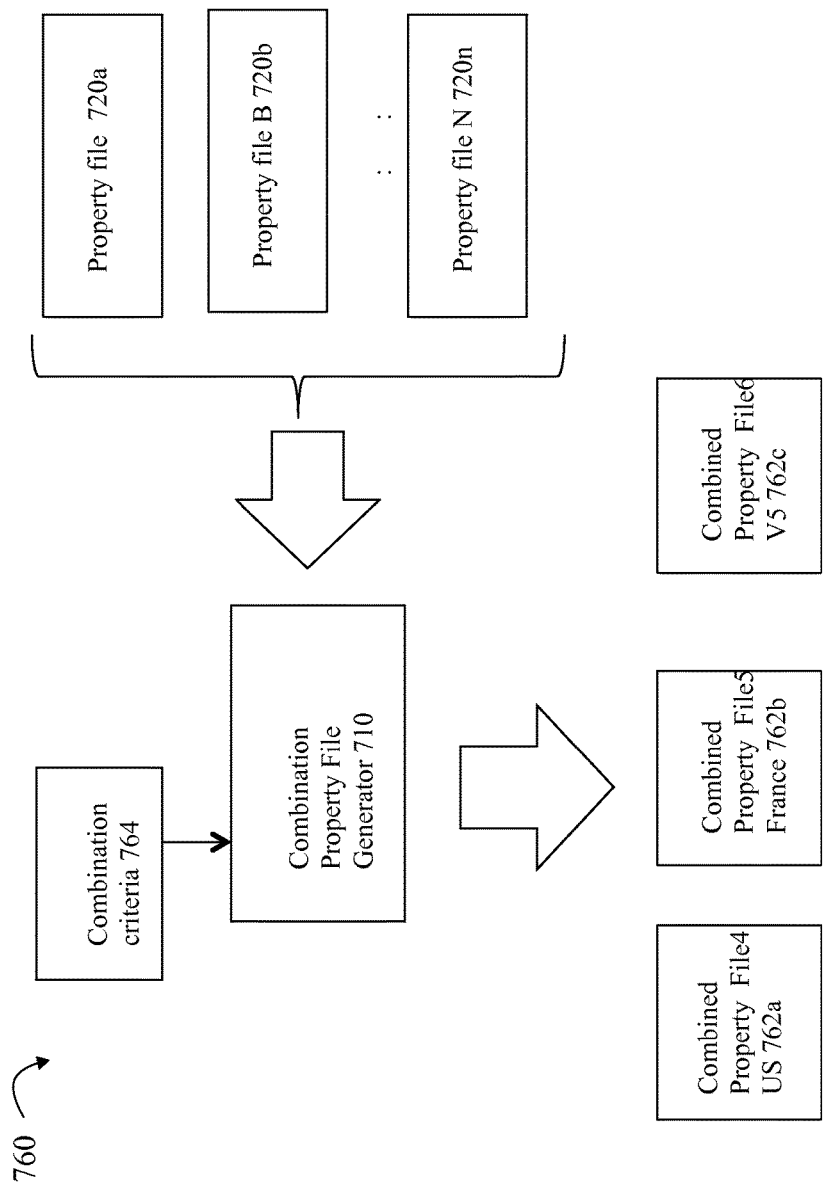

As a second example with reference to FIG. 9B, the generator 710 may receive combination criteria 764 to generate 3 different combination files 762a-c. The combination criteria 764 may include information to combine a portion of the property files 720a-n for a particular country. Assume US represents the two letter code for United States and FR represents the two letter code for France. Consistent with the property file naming convention noted above, property files across all 3 applications used for the US occur when YY as in the property file name="US" having the general form of: *_US.PROP. The combination criteria 764 may include information identifying all US property files as just noted to generate a fourth combined property file 762a. Consistent with the property file naming convention noted above, property files across all 3 applications used for France occur when YY as in the property file name="FR" having the general form of: *_FR.PROP. The combination criteria 764 may include information identifying all France (FR) property files as just noted to generate a fifth combined property file 762b.

Also, assume that V5 represents a particular distributor or vendor. Consistent with the property file naming convention noted above, all property files for this particular distributor or vendor V5 occur when Vn as in the property file name="V5" having the general form of: *_V5_*.PROP. The combination criteria 764 may include information identifying all property files for V5 as just noted to generate a sixth combined property file 762c.

In this manner, the combination criteria 764 may more generally include information to select one or more property files for combining into a combined property file whereby the combination criteria may include information based on the predetermined property file naming convention used to identify and select the files which are combined.

It should be noted that the portion of the individual property file name "APP" denoting an application may also, more generally, denote different code execution entities. For example, a unique sequence of one or more characters may be used as an APP portion of the individual property file name to denote code executed in connection with a particular dialogue, wizard, and the like. Thus, more generally, if there is only a single application having its own set of code entities (e.g., dialogues, wizards and the like) requiring customized property values, the individual property file names may not require designation of a particular application and may rather use the portion of the individual property files name space denoted as APP herein to denote a particular one of the different code entities within the single application. If there are multiple possible applications whereby each such application may include its own set of code entities requiring customized property files, the portion of the individual property files name space denoted as APP herein may indicate a particular one of the multiple applications and also the particular code entity of the particular application. For example, application 1 may be denoted as APP1 and application 2 may be denoted as APP2. Each of these application may include two dialogues denotes a D1 and D2. In this manner, individual property files may include a filename denoting an encoding for both a particular application (e.g., APP1 or APP2) in combination with a particular dialogue (e.g., D1 or D2). In this manner, to further illustrate with reference back to FIG. 9B, an embodiment may provide combination criteria 764 identifying all property files for a particular application such as APP1 combined into a single combined property file. As a variation, combination criteria 764 may specify to combine property files for a particular application such as APP1 and its dialogue D1 into a first combined property file, and also to combine property files for the particular application APP1 and its dialogue D2 into a second different combined property file. In this manner, property files may be combined for a particular code entity of a particular application.

With reference back to FIG. 9, the generator 710 may generate metadata for each individual property file 720a-n received as an input and the property file metadata may be included in the combined property file 730. The generator 710 may also generate metadata for the combined property file 730 itself whereby such combined property file metadata is included in the combined property file 730. Generally, the property file metadata is information about an individual property file. In one aspect, the property file metadata may be characterized as a descriptor of information about one of the property files 720a-n. In a similar manner, the combined property file metadata is information about generated combined property file (e.g., the combined property file metadata may be characterized as a descriptor of information about the combined property file 730). The foregoing metadata about the individual property files 720a-n and, optionally, the metadata about the combined property file 730 may be included in the combined property file 730.

Figure 10:
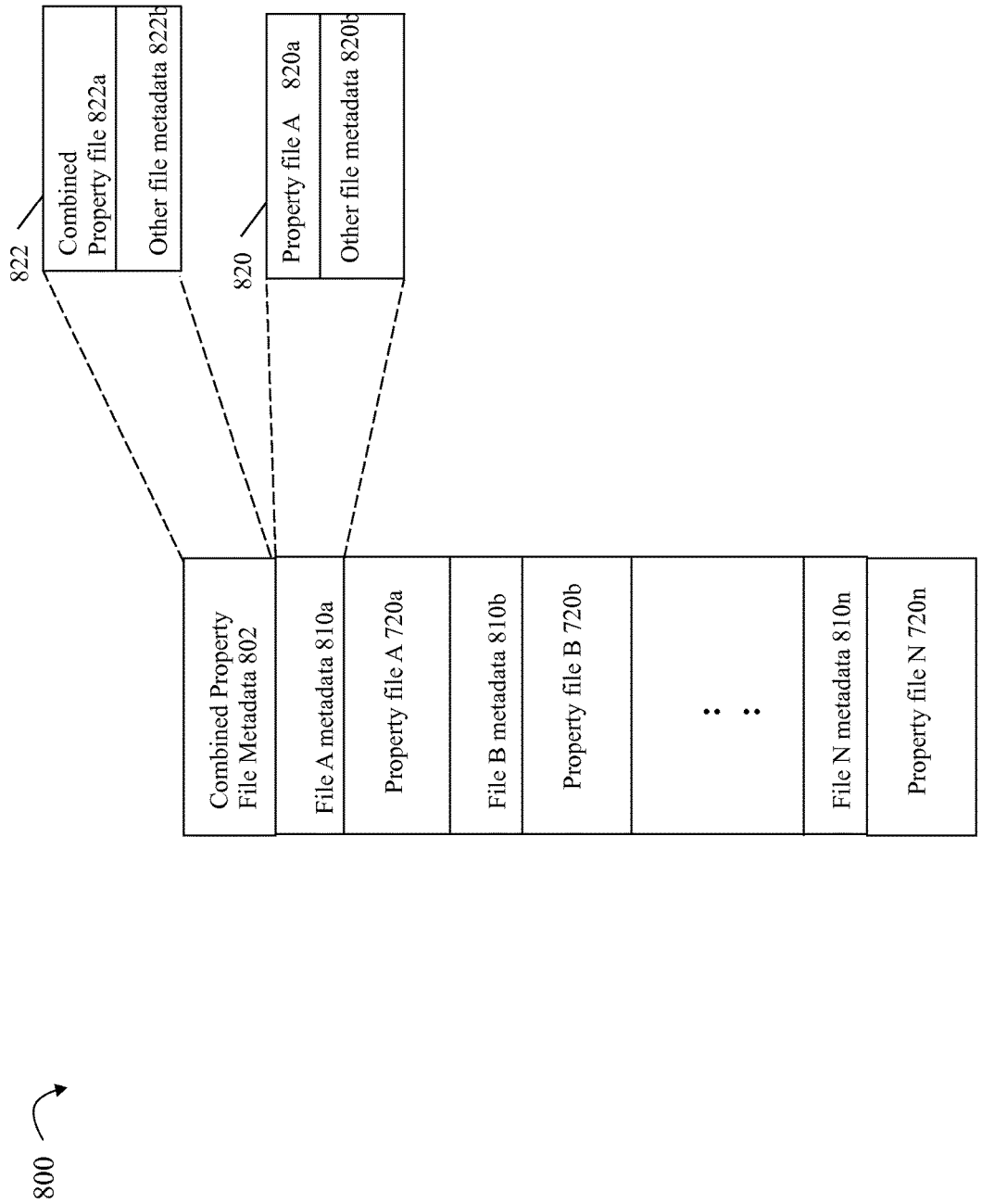
FIGS. 10 and 11 are examples of combined property file formats that may be used in an embodiment in accordance with techniques herein.

Referring to FIG. 10, shown is a first exemplary representation 800 of a combined property file that may be used in an embodiment in accordance with techniques herein. The example 800 illustrates a first format of a combined property file, such as denoted by element 730 of FIG. 9. The combined property file in the example 800 may include property files 720a-n, metadata portions 810a-n for the N property files read in by the generator 710 and combined property file metadata 802.

In the example 800, file A metadata 810a is generated and included in the combined property file prior to property file A 720a. File B metadata 810b is generated and included in the combined property file prior to property file B 720b. File N metadata 810n is generated and included in the combined property file prior to property file N 720n. The combined property file of the example 800 may also include combined property file metadata 802.

Element 820 provides further detail regarding information that may be included in property file metadata portion 810a. Property file A's metadata 810a may include the name of the property file, Property file A, denoted by 820a, and may also optionally include other file metadata 820b. The other file metadata 820b may include, for example, a size of the property file data (such as in bytes), version information, a source location from which property file A was obtained or read in by the generator 710, date/time information identifying the date/time associated with property file A, and the like. It should be noted that although the further details of element 820 are only illustrated in FIG. 10 for property file A, each of the file metadata portions 810b-n may include similar information for their respective property files.

Element 822 provides further detail regarding information that may be included in the combined property file metadata 802. The combined property file metadata 802 may include the name of the combined property file denoted by 822a, and may also optionally include other file metadata 822b. The other file metadata 822b may include, for example, a size of the combined property file data (such as in bytes), version information, date/time information identifying the date/time that the generator 710 created the combined property file, and the like.

The example 800 illustrates a combined property file layout or format whereby the property file metadata for each property file may immediately precede the property file. For example, file A's metadata 810a may appear in the combined property file immediately prior to the property file A 720a. More generally, a property file's metadata may be located adjacent to the property file. In this manner, as a variation to the illustration of FIG. 10, the metadata for each individual property file may alternatively be located following the property file whereby the locations of 810a and 720a in the combined property file may be reversed. In a similar manner, the combined property file may reverse or swap the ordering of each property file and its associated metadata in the combined property file (e.g., ordering of 810b and 720b are reversed, ordering of 720n and 810n are reversed). Also, the example 800 illustrates that the combined property file metadata 802 is located at the beginning of the combined property file. As a variation, the combined property file metadata 802 may be omitted, or may be included at the end of the combined property file (e.g., following property file N 720n).

Figure 11:
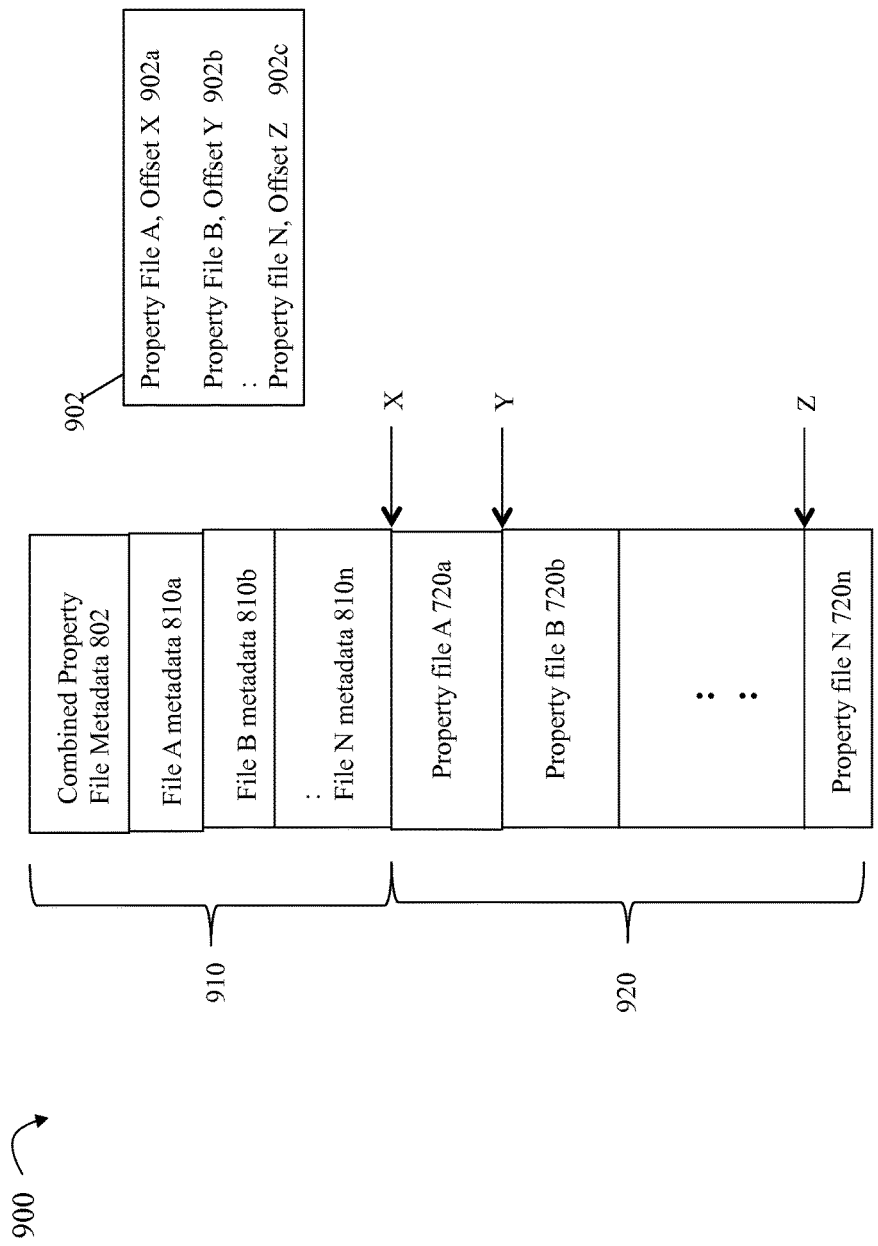

Referring to FIG. 11, shown is a second exemplary representation 900 of a combined property file that may be used in an embodiment in accordance with techniques herein. The example 900 illustrates a second format of a combined property file, such as denoted by element 730 of FIG. 9. The combined property file in the example 900 may include property files 720a-n, metadata portions 810a-n for the N property files read in by the generator 710 and combined property file metadata 802 as described in connection with FIG. 10 with some differences. A first difference is that all metadata portions 810a-n and 802 (optionally included) may be included in a first portion 910 of the combined property file followed by a second portion 920 of all property files 720a-n. A second difference is that the first portion of metadata 910 may include additional information 902 denoting a starting offset or index of each of the property files in the second portion 920. Element 902 is an example illustrating in more detail this additional metadata information included in the first portion 910. As illustrated by 902, element 902a is information denoting a starting address or offset X of property file A within the combined property file, element 902b is information denoting a starting address or offset Y of property file B within the combined property file, and element 902c is information denoting a starting address or offset Z of property file N within the combined property file. In one embodiment, the offset or address for each property file may be included in the per property file metadata portions 810-n. For example, the offset X of 902a may be included in file A metadata 810a, the offset Y of 902b may be included in file B metadata 810b and the offset Z of 902c may be included in file N metadata 810n. As an alternative, the information of 902 may be collectively included in the combined property file metadata 802. Each of X, Y and Z may identify an address or offset within the combined property file. Such values may be absolute offsets with respect to the starting or base address of 0 denoting the first logical address or starting location of the combined property file.

A property file read in as an input to the lookup service may be characterized as having a property file type of either "combined" or "individual". The type of "combined" may denote a one of the combined file formats such as, for example, one of the combined file formats as described in connection with FIGS. 10 and 11. The type of "individual" may denote that the property file is an individual or non-combined property file. Examples of individual property files are property files 120a-n of FIG. 3 and 720a-n. Thus, consistent with other discussion herein, each individual property file may include content and, more generally, values for properties affecting the manner in which UI elements of a UI are displayed and operate for one set of customized UI elements for a particular application. As described elsewhere herein, the properties in a single property file may be customized based on a combination of factors such as, for example, application, language, geographical location, country, vendor or distributor, and the like. In this manner, first and second property files may each include different property values providing for different customized UI elements. The combined property file may be characterized as including multiple sets of such property values providing for multiple sets of UI element customizations.

Referring back to FIG. 3, shown are components that may be used in connection with an embodiment at runtime to determine a property value in an embodiment in accordance with techniques herein.

Figure 12:
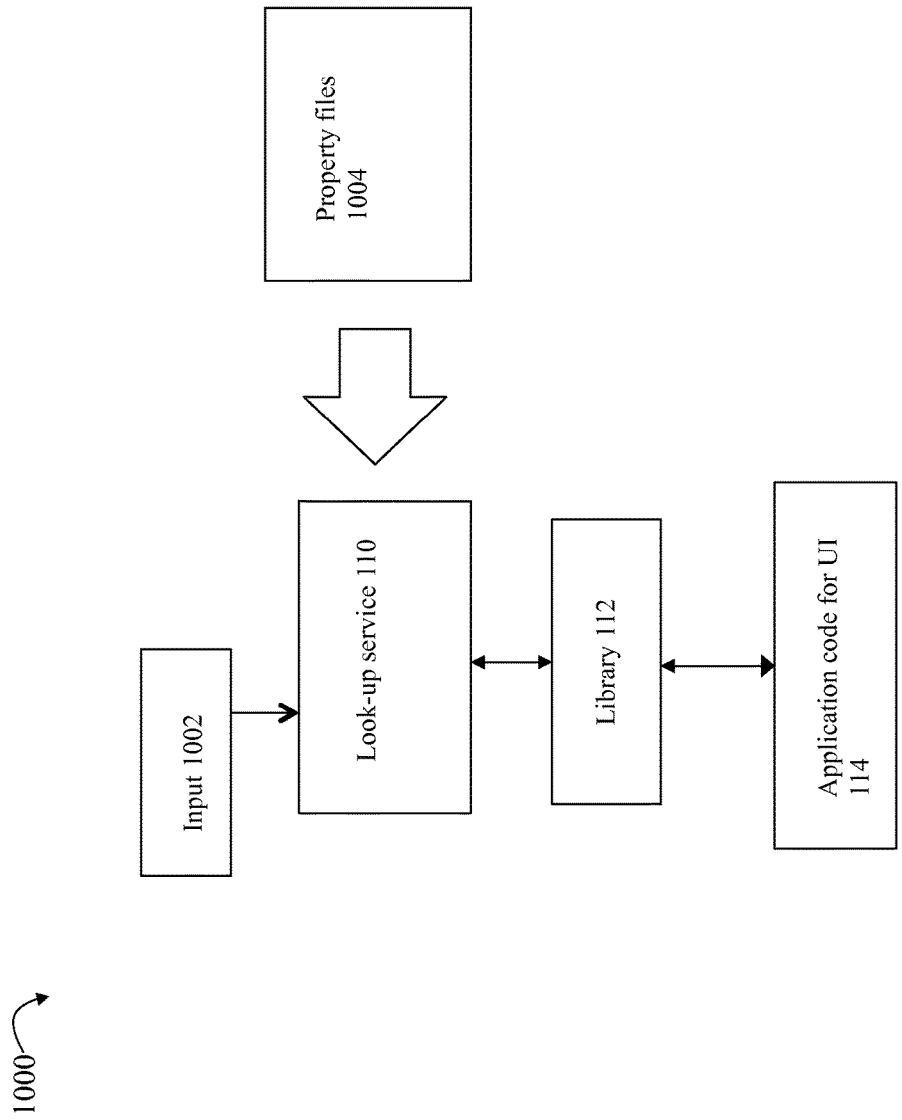

What will now be described with reference to FIG. 12 are components as described in connection with FIG. 3 with the additional input 1002 denoting whether the one or more property files 1004 are individual property files (e.g., elements 720a-n as described in connection with FIG. 3) or are combined property files (e.g., multiple instances of 730 as just described in connection with FIG. 9).

With reference to FIG. 12, an input 1002 may be provided to the lookup service 110 executing at a point in time indicating whether property files 1004 read in by the lookup service 110 are individual property files or combined property files. In this embodiment, the property files 1004 may be of only a single type—all property files are either combined property files of the same format or layout (e.g., either all as in FIG. 10 or all as in FIG. 11) or all property files read in are individual property files. The lookup service 110 may be provided with an input 1002 such as at runtime when the lookup service 1002 commences execution, which identifies the property file type as either individual or combined. The lookup service 110 may be coded with logic which performs first processing when the property files 1004 provided as input are individual property files, and second processing when the property files 1004 provided as input are combined property files. The code of the lookup service may expect each of the property types to have predetermined formats such as described herein.

As a further variation, an embodiment may support multiple combined property file formats or layouts as well as individual property files. In this case, the possible property files types may include a different type identifying each different file format. For example, assume an embodiment supports individual property files, a first combined property file format as in FIG. 9 and a second combined property file format as in FIG. 10. The property file types may be individual denoting an individual property file such as one of 720a-n, combined1 denoting a first combined property file format such as illustrated in FIG. 9 and combined2 denoting a second combined property file format such as illustrated in FIG. 10. The foregoing may be generalized to support any number of supported file formats or layouts.

As a variation to the foregoing, the lookup service 110 may be provided with property files 1004 of multiple types whereby not all of the property files 1004 are of the same type. In this case, the property files 1004 read as inputs may include information or metadata denoting the property file type as individual or combined, or one of a plurality of possible combined file formats. In one embodiment, a combined property file may include combined property file metadata such as described in connection with FIGS. 10 and 11. The combined property file metadata may be read in by the lookup service 110 identifying whether the following data of the property file has a layout or format of a combined property file such as in FIG. 10 or FIG. 11. For example, the combined property file metadata 802 may include a name-value pair such as where the name is a reserved keyword denoting the combined property file, and the value is the name or identifier of the combined property file. To further illustrate, the following may be included in the combined property file metadata 802:

Combined_property_file="FILE1"

denoting that the property file is a combined property file having a name or identifier FILE1. Also, if there are multiple supported combined property file formats or layouts a second line in the combined property file metadata 802 may identify the particular combined property file format. For example, assume that there are two supported combined file format as described in connection with FIG. 9, a first format, and FIG. 10, a second format. The second line in the combined property file metadata 802 may be:

Layout="1"

denoting that the current combined property file has the first format of FIG. 9. If the second line is alternatively:

Layout="2"

then the combined format denoted for the current combined property file is the second format of FIG. 10.

More generally, the value associated with the Layout name above may be any one of a set of predetermined values each identifying a different supported property file layout or format. If the first line of the file does not include the name-value pair of Combined_property_file as noted above, the lookup service 110 may by default assume that the property file is an individual property file format (e.g., such as 720a-n of FIG. 9 and 110a-n of FIG. 3). In this manner, the lookup service may read the first line of the file to determine whether to process the remaining file contents as a combined property file or an individual property file (e.g., in accordance with the combined property file layout or individual property file layout).

In connection with techniques herein with reference to FIG. 12, one or more combined property files may be provided as inputs to the look-up service and may be processed in a manner as described herein as the individual property files with respect to determining UI element property files based on a defined lookup chain or priority chain defining an ordered list of property files (e.g. see FIG. 4 for an example). In other words, the different property values included in the combined property file and obtained from different individual property files may be processed in a manner similar to that as if the property values were read in directly from the individual property files by the look-up service.

With reference back to FIG. 9 to further illustrate how and when the combined property file 730 may be utilized, the combined property file 730 may be read as an input by the look-up service 110 rather than the individual property files 120*a-n* as illustrated. In one embodiment, the processing described in connection with FIG. 9 to generate the combined property file 730 may occur at build time in connection with generating the software components included in a released software product. In this manner, one or more combined property files 730 may be generated by the development team or software vendor at a first point in time whereby the combined property files 730 are components included in a released product along with other software components (e.g., look-up service 110, library 112) of the released product. In this manner, the individual property files may be used and generated by software development. When the time comes to run a build to generate the software components of the released product, one or more combined property files may be generated and included in the released product.

As a variation to the foregoing and rather than including combined property files in a released product, an embodiment may ship the released product with software components including the individual property files 720*a-n* and combined property file generator 710. In this manner, the components 720*a-n* and 710 may be installed on a customer system with the released product. Once installed, the generator 710 may be executed to generate the one or more combined property files 730. The foregoing generation of the one or more combined property files 730 at an installed site may be performed at any suitable time. As a first example, the foregoing generation of one or more combined property files 730 may be performed as part of the installation of the released product. As a second example, the foregoing generation of one or more combined property files 730 may be performed when code utilizing the library 112 and lookup service 110 is launched or commences execution. As a third example, the foregoing generation of one or more combined property files 730 may be performed on demand/when requested. In connection with this third example, an update may be shipped which replaces or adds an individual property file. Any combined property file including the replacement or new individual property file may be accordingly regenerated at the customer installed site on demand.

With reference to FIG. 12, existing the property files (individual and/or combined property files) may be loaded on demand as needed by the look-up service. This is described in more detail below.

Figure 13:
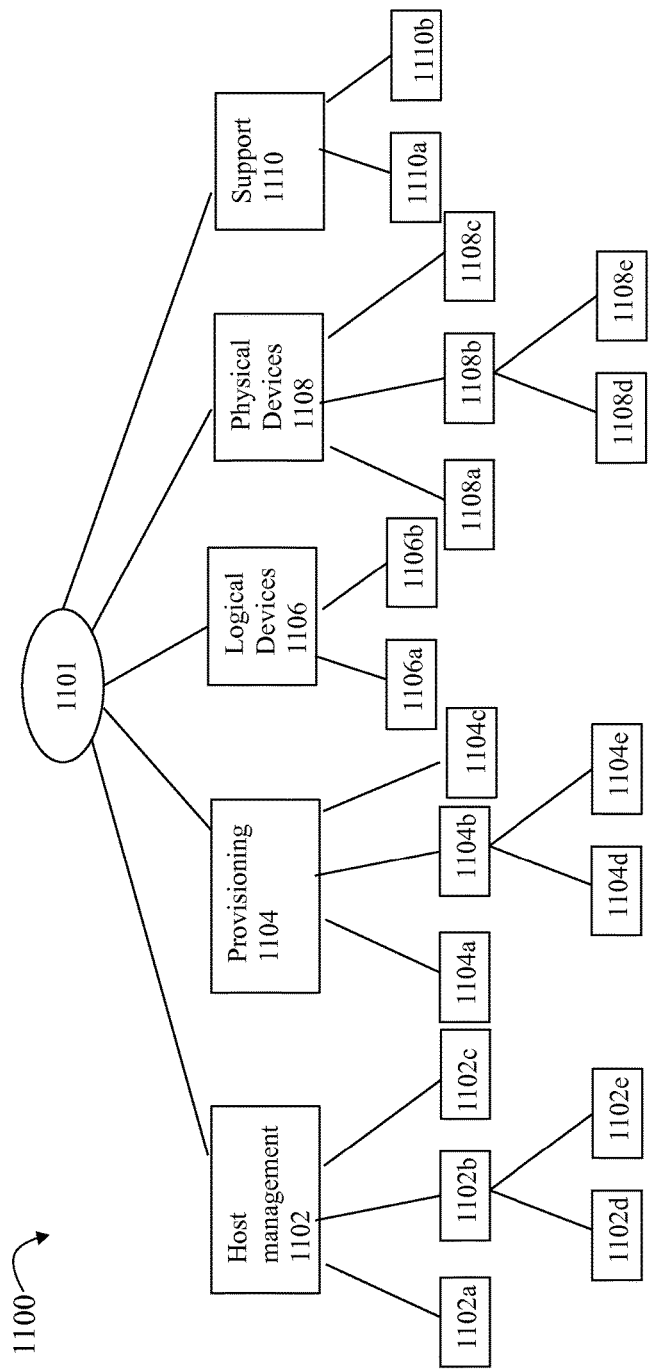
FIGS. 13 and 14 illustrate use of combined property files with UI navigation that may be used in an embodiment in accordance with techniques herein.

Referring to FIG. 13, shown is an example 1100 of a hierarchical structure associated with a GUI's displays or screenshots in an embodiment in accordance with techniques herein. For example, the example 1100 illustrates a hierarchical structure corresponding to UI displays or pages that the user may navigate to such as in connection with data storage management application. The structure 1100 in this example forms a tree having a root node 1101 at level 0, nodes 1102, 1104, 1106, 1108 and 1110 at level 1, nodes 1102*a-c*, 1104*a-c*, 1106*a*0*b*, 1108*a-c* and 1110*a-b* at level 2, and nodes 1102*d-e*, 1104*d-e* and 1108*d-e* at level 3. A node at level N may have child nodes connect to it at level N+1. For example, nodes 1102*a-c* are child nodes of node 1102 and node 1102 is the parent node of child nodes 1102*a-c*. A node which has no child nodes is also a leaf node. A path may be defined from the root at level 0 to a second node at another level greater than 0 in the hierarchy whereby the path includes the root node and any intervening nodes traversed from the root to reach the second node. For example, a path may defined by 1101, 1106, 1106*b*. A second path may be defined by 1101, 1108 1108*b*. More generally, a path may be defined between two nodes in the tree as follows: a path between a first node at level N to a second node at a level M>N may represent a navigational path through UI displays of each node on the path. A first node may be a descendant of a second node if the second node is included in a path from the root to the first node (e.g., there are one or more intervening nodes connecting the second node to the first node where each node in the path is at a different level in the hierarchy).

Element 1101 is the root denoting that initially, the UI display may include a first level of menu options, buttons or other UI elements for host management 1102, provisioning 1104, logical devices 1106, physical devices 1108 and support 1110. Thus the nodes 1102, 1104, 1106 and 1108 at level 1 may represent the major partitioned navigational sections of the UI displays. Each of the nodes in levels 2 and 3 may represent a UI display or page that may be rendered in connection with UI navigation. A user may navigate to a UI display corresponding to a first node at level 2 by selecting the UI element corresponding to the first node's parent at level 1. A user may navigate to a UI display corresponding to a first node at level 3 through the first node's parent at level 2.

A user may select a UI element associated with any one of 1102, 1104, 1106, 1108 and 1110 and result in rendering another UI display associated with a child node of the selected node. For example with reference to FIG. 14, element 1101 may illustrate the initial UI display corresponding to the root node including 4 UI elements 1101*a-d* such as buttons for host management, provisioning, logical devices, physical devices and support. In this example, selecting hosts 1101*a* may result in a UI display 1102 corresponding to the node in FIG. 13 having the same number. The UI display may include 3 hyperlinks or navigational links (such as in connection with navigating in a browser)—LINK1, LINK2, and LINK3. Selection of LINK 1 of 1102 may result in UI navigation to UI display 1102*a*. Selection of LINK 2 of 1102 may result in UI navigation to UI display 1102*b* having two links LINK4 and LINK 5. Selection of LINK 4 of 1102*b* may result in UI navigation to UI display 1102*d*. Selection of LINK 5 of 1102*b* may result in UI navigation to UI display 1102*e*. Selection of LINK 2 of 1102 may result in UI navigation to UI display 1102*c*.

Thus, UI displays and associated UI elements associated with a single application may be partitioned into major navigational sections of the hierarchy as illustrated by the 5 groupings at level 1 of FIG. 13. In this manner, a different combined property file may be created including UI elements and associate property values for each of the 5 groupings (e.g., 5 combined property files). To further illustrate, assume a first combined property file includes properties for UI elements for a first portion of UI displays for host management for application 1, a second combined property file includes properties for UI elements for a second portion of UI displays for provisioning for the same application 1, third combined property file includes properties for UI elements for a third portion of UI displays for logical devices for the same application 1, a fourth combined property file includes properties for UI elements for a fourth portion of UI displays for physical devices for the same application 1, and a fifth combined property file includes properties for UI elements for a fifth portion of UI displays for support for the same application 1.

Consistent with the property file naming convention described above, the occurrence of "APP" in the individual property file names may be expanded to allow for partitioning the property files for different UI elements associated with the foregoing 5 groupings of different UI displays. For example, an individual property file such as 720a-n may follow the following naming convention:

APP_NAVi_XX_YY_Vn.PROP where APP, XX, YY and Vn are as described above and NAVi represents one of the 5 UI navigational groupings described above, where "i" may be a value from 1 to 5 (e.g., NAV1 corresponds to host management 1102, NAV2 corresponds to provisioning 1104, NAV3 corresponds to logical devices 1106, NAV4 corresponds to physical devices 1108, and NAV5 corresponds to support 1110. In this manner as described elsewhere herein, a combination file may be generated that combines the set of individual property files for a defined grouping, such as a UI navigational grouping, for an application. In connection with this example, 5 combination files may be generated for application 1.

Figure 14:
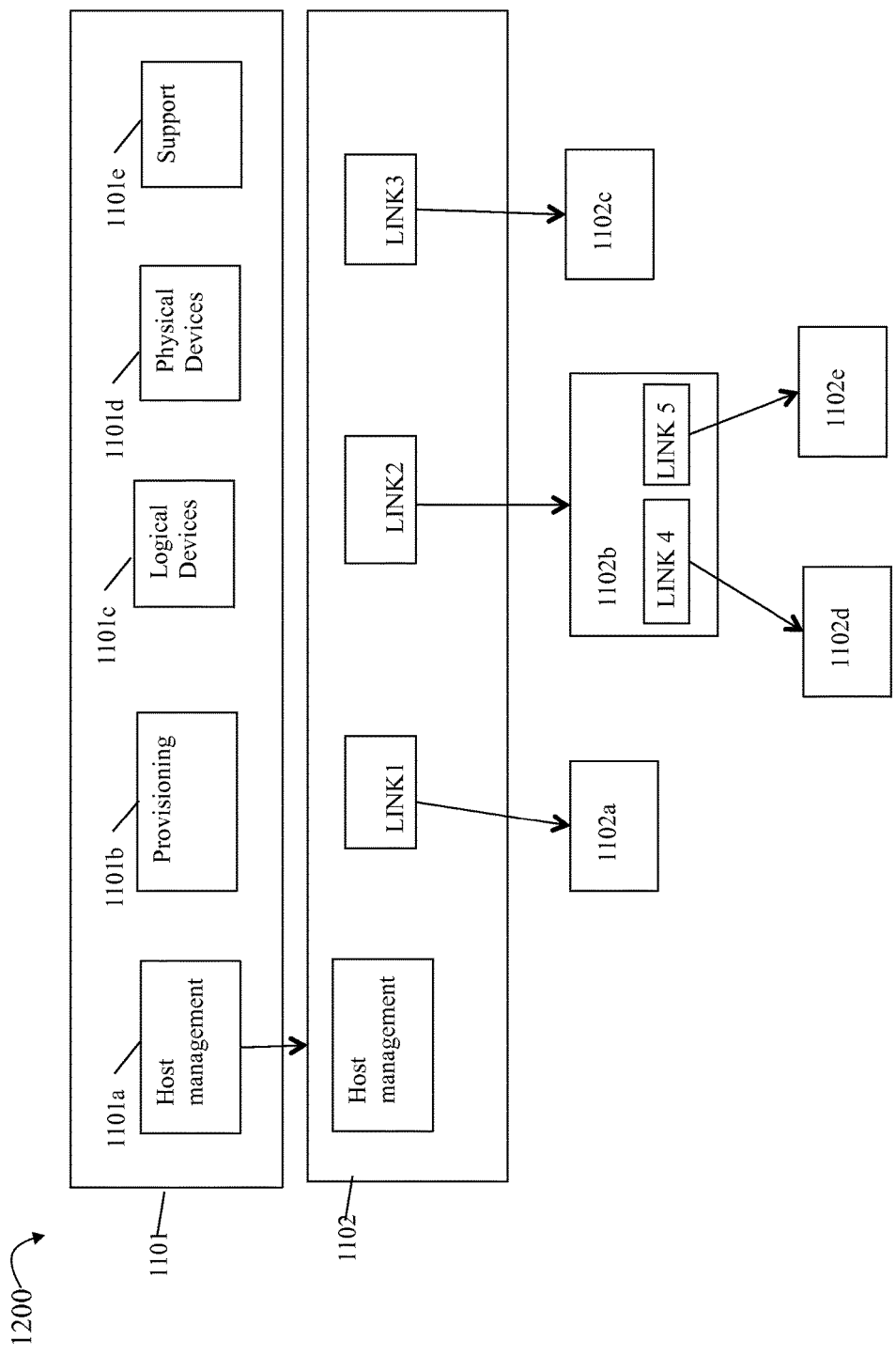

As yet another example with reference to FIGS. 12, 13 and 14, the UI code 114 of FIG. 12 may be executing and as a user navigates to particular pages or screens, the application code of the UI 114 may request particular property values from the look-up service triggering the loading of a particular combined property file on demand. For example, 5 combined property files corresponding to the 5 navigational groupings noted above (e.g., FIG. 13) may be generated and stored on a server for use by the lookup service 110. The lookup service 110, library 112, and code 114 may be included in a client such as the management system/computer executing the data storage management application. UI may be displayed by the UI application code 114 such as in response to a user selection. As described above in connection with rendering the UI display, the application code 114 performs an API call to code of a library 112 which performs a call to the look-up service 110 to determine one or more particular UI element property values. The lookup service 110 may request and load one or more property files on demand in response to a request from the code 114 (which is in effect responsive to a request for UI element property values needed to render a UI display). In this case, the property files (combined and/or individual) may be already in existence and loaded on demand into memory for use by the look-up service. For example, as a user navigates or selects a UI element associated with one of the 5 different navigational groupings, the combined property file for that particular navigational grouping may be loaded into memory of the lookup service for use. For example, a user may make a selection resulting in rendering a UI display of the host management grouping 1102. In response, the look-up service may load a first combined property file providing UI element property values for all UI displays in the grouping 1102. At a later point in time, the user may make a selection resulting in rendering a UI display of the logical devices grouping 1106. In response, the look-up service may unload or clear from its memory values stored for the first combined property file and may accordingly load a second combined property file providing UI element property values for all UI displays in the grouping 1106. In this manner, use of combined property files sent from the server to the client may result in a decrease in the number of individual calls or requests issued as opposed to requesting individual property files in separate requests.

As a variation to the foregoing, rather than have property files already in existence, one or more property files may be first generated on demand when such property files are needed for use by the look-up service and then secondly loaded on demand into memory for use by the lookup service. The application code of the UI 114 may request particular property values from the look-up service triggering not only the loading but also the generation of a particular combined property file. In other words, as just described, a UI navigation triggered loading property values from an existing combined property file, such as the first combined property file for host management 1102, on demand into memory for use by the lookup service 110. Additionally with this variation, the UI navigation may trigger on demand both the creation of the first combined property file and then also loading its property values on demand into memory for use by the lookup service 110.

It should be noted that an embodiment of the combination property file generator may perform other processing in addition to that as described above. The generator may also perform compression of the contents of the individual property files being combined. For example, the generator may remove blank lines, carriage returns, and the like, from the individual property files prior to the combined property file into the generated combined property file. The combination file generator may also further process the individual property files to determine particular property values for different properties based on the defined lookup chain specifying an ordered list in which the property files are read and processed by a look-up service. In other words, the generator may perform processing needed to resolve and determine a value for a particular property in connection with multiple individual property files referencing the same UI element's property such as described elsewhere herein. For example, the generator may perform processing as described in connection with FIG. 4 to determine a property value where multiple individual property files being combined reference the same UI element and property value. In this manner, the resolution processing performed to determine a final UI element property value may be performed by the generator rather than at runtime by the lookup service.

In connection with examples described herein and in connection with processing performed, such as by the lookup service 110 of FIGS. 3 and 12, the look-up chain may represent a prioritized ordering of property files whereby if two different property files both specify a different value for the same property, the value assigned to the property in the file that occurs the latest in the lookup chain is the final resulting property value. Thus, the value assigned to the property in the latest occurring file in the look-up chain overrides any previous value assignments for the same property. In this manner, the look-up chain may define a prioritized ordering of multiple property files whereby a second file that occurs after a first file in the ordering may have a higher priority in that any values for properties in the second file may override values for the same properties occurring in the first file. The foregoing describes a processing order in which the property files may be traversed in terms of increasing priority so that all property files are traversed. Rather than perform processing whereby all property files are traversed in the look-up chain in the foregoing increasing prioritized ordering, an embodiment may alternatively process the property files in the reverse ordering (e.g., from highest to lowest priority). If a value for a property is determined by traversing the property files in order from highest to lowest priority, processing may not require traversing all property files in that processing performed to determine a value for a particular property may stop as soon as a first property value assignment for the particular property has been located in one of the property files. It should be noted that this property file processing order from highest to lowest priority may be generally performed in connection with any examples as described herein although processing may also be performed in connection with processing property files from the lowest to the highest priority to determine a final property value.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media (also referred to as computer readable media) may include, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of generating and using a combined property file comprising:
   providing a plurality of individual property files, the plurality of individual property files specifying a plurality of property values for properties of user interface elements for an application, said plurality of property values including a first value for a first property of a user interface element for the application, wherein said plurality of individual property files have file names in accordance with any of a predetermined file naming convention and a predetermined file naming pattern;
   executing a combination property file generator to perform first processing, said first processing including: combining at least a first portion of said plurality of individual property files into the combined property file, wherein the combination property file generator uses combination criteria to select the first portion of individual property files from said plurality of individual property files, said combination criteria including information based on the any of the predetermined file naming convention and the predetermined file naming pattern which the combination property file generator uses to identify particular ones of the plurality of individual property files comprising the first portion which are combined, wherein defined property file types include individual and combined, and wherein the combined property file includes combined property file metadata comprising first information that identifies the combined property file as having a specified one of a plurality of combined property file layouts and identifies the combined property file as the combined defined property file type; and
   determining a first property value for the first property of the user interface element, wherein said first property value is determined by performing processing at runtime of the application in accordance with a predetermined look-up chain specifying a prioritized ordering of the plurality of individual property files from a highest to a lowest priority, wherein at least the first portion of the plurality of individual property files of the combined property file are processed by said processing, in order from the highest to the lowest priority, to determine the first property value for the first property of the user interface element whereby said processing stops with a first occurrence assigning a property value to the first property.

2. The method of claim 1, wherein the combined property file has a first file format, said combined property file including property values for properties of user interface elements specified in each individual property file in the first portion and including metadata for each individual property file in said first portion.

3. The method of claim 2, wherein the metadata for said each individual property file includes a name or identifier for said each individual property file.

4. The method of claim 3, wherein the first file format logically locates said each individual property file and metadata for said each individual property file immediately adjacent to one another in the combined property file.

5. The method of claim 3, wherein the first file format includes a combined metadata portion and a combined property file portion, wherein said combined metadata portion includes the metadata for each of the individual property files in the first portion and wherein said combined property file portion includes property values for properties of user interface elements obtained from each of the individual property files, said combined metadata portion being logically located in the combined property file prior to said combined property file portion.

6. The method of claim 5, wherein the combined metadata portion includes an identifier for each of the individual property files in the first portion and an associated offset denoting a starting logical location in the combined property file at which property values for properties of user interface elements obtained from said each individual property file are located.

7. The method of claim 6, wherein the first file format is a first of a plurality of combined property file formats and the combined metadata portion includes first information denoting said first combined property file format.

8. The method of claim 7, further comprising:
   invoking a look-up service to determine the first property value for the first property of the user interface element of said application, wherein said look-up service processes one or more files including said combined property file including property values for properties of user interface elements and wherein said look-up service processes content of the combined property file in accordance with a format of said combined property file and in accordance with said prioritized ordering of said predetermined look-up chain to determine final values for properties included in said combined property file.

9. The method of claim 8, wherein said one or more files includes a first of said plurality of individual property files not included in the first portion.

10. The method of claim 9, wherein said look-up service processes said first individual property file and said combined property file including property values obtained from the first portion of individual property files in accordance with said prioritized ordering to determine final values for properties included in said combined property file.

11. The method of claim 10, wherein a first set of property values for properties of user interface elements included in the combined property file and obtained from said first portion of individual property files are processed in accordance with said prioritized ordering thereby in a manner similar to that as if the first set of property values are read in directly from each individual property file in said portion by the look-up service.

12. The method of claim 1, wherein said combination property file generator is executed and performs said first processing in connection with any of: installation of said first application, on demand in response to a request, and as part of building software components of said first application prior to installation.

13. The method of claim 8, wherein said look-up service reads said combined property file in response to a request for said first property value for said first property of said user interface element of said application, and said combined property file is generated by said combination property file generator responsive to said request.

14. The method of claim 7, wherein said predetermined look-up chain includes one or more individual property files in accordance with a chain of entities distributing said application thereby providing for customization by said entities, and wherein said predetermined look-up chain includes one or more individual property files specifying different user interface settings customized in accordance with any of a geographic location, language and dialect of a particular language.

15. The method of claim 1, wherein said first property affects any of a visual aspect of said user interface element when displayed, user interaction with said user interface element, a font, text size, a color, a physical dimension, a location or placement of said user interface element in connection with displaying, an ordering of said user interface element relative to one or more other user interface elements, a target location from which a webpage is retrieved responsive to selecting the user interface element associated with said target location, a location of a file that includes an image displayed in connection with said user interface element, and whether said user interface element is any of enabled, disabled and hidden when displaying a user interface, and wherein said user interface element is any of a menu, a menu bar, a menu item, a text box, a button, a navigation section including one or more hyperlinks, a hyperlink, a table, a drop-down list, a list box, a check box, a dialog box, a wizard, and a combo box.

16. A non-transitory computer readable medium comprising code stored thereon that, when executed, performs a method of generating and using a combined property file comprising:

providing a plurality of individual property files, the plurality of individual property files specifying a plurality of property values for properties of user interface elements for an application, said plurality of property values including a first value for a first property of a user interface element for the application, wherein said plurality of individual property files have file names in accordance with any of a predetermined file naming convention and a predetermined file naming pattern;

executing a combination property file generator to perform first processing, said first processing including: combining at least a first portion of said plurality of individual property files into the combined property file, wherein the combination property file generator uses combination criteria to select the first portion of individual property files from said plurality of individual property files, said combination criteria including information based on the any of the predetermined file naming convention and the predetermined file naming pattern which the combination property file generator uses to identify particular ones of the plurality of individual property files comprising the first portion which are combined, wherein defined property file types include individual and combined, and wherein the combined property file includes combined property file metadata comprising first information that identifies the combined property file as having a specified one of a plurality of combined property file layouts and identifies the combined property file as the combined defined property file type; and determining a first property value for the first property of the user interface element, wherein said first property value is determined by performing processing at runtime of the application in accordance with a predetermined look-up chain specifying a prioritized ordering of the plurality of individual property files from a highest to a lowest priority, wherein at least the first portion of the plurality of individual property files of the combined property file are processed by said processing, in order from the highest to the lowest priority, to determine the first property value for the first property of the user interface element whereby said processing stops with a first occurrence assigning a property value to the first property.

17. The method of claim 1, wherein each of the particular ones of the plurality of individual property files of the first portion which are combined has a file name in accordance with the information of the combination criteria.

18. A system comprising:
a processor; and
a memory comprising code stored thereon that, when executed, performs a method of generating and using a combined property file comprising:
providing a plurality of individual property files, the plurality of individual property files specifying a plurality of property values for properties of user interface elements for an application, said plurality of property values including a first value for a first property of a user interface element for the application, wherein said plurality of individual property files have file names in accordance with any of a predetermined file naming convention and a predetermined file naming pattern;
executing a combination property file generator to perform first processing, said first processing including: combining at least a first portion of said plurality of individual property files into the combined property file, wherein the combination property file generator uses combination criteria to select the first portion of individual property files from said plurality of individual property files, said combination criteria including information based on the any of the predetermined file naming convention and the predetermined file naming pattern which the combination property file generator uses to identify particular ones of the plurality of individual property files comprising the first portion which are combined, wherein defined property file types include individual and combined, and wherein the combined property file includes combined property file metadata comprising first information that identifies the combined property file as having a specified one of a plurality of combined property file layouts and identifies the combined property file as the combined defined property file type; and determining a first property value for the first property of the user interface element, wherein said first property value is determined by performing processing at runtime of the application in accordance with a predetermined look-up chain specifying a prioritized ordering of the plurality of individual property files from a highest to a lowest priority, wherein at least the first portion of the plurality of individual property files of the combined property file are processed by said processing, in order from the highest to the lowest priority, to determine the first property value for the first property of the user interface element whereby said processing stops with a first occurrence assigning a property value to the first property.

19. The method of claim 1, wherein said plurality of individual property files assign the plurality of property values to the user interface elements by referencing unique identifiers identifying the user interface elements, and wherein the user interface element is uniquely identified using a first of the unique identifiers and the first unique identifier is assigned the first property value in one of the individual property files processed by said processing at runtime of the application.

* * * * *